(12) United States Patent
Chan

(10) Patent No.: US 12,474,988 B1
(45) Date of Patent: Nov. 18, 2025

(54) PERFORMANCE PROFILING OF CLOUD HOSTED SERVICES

(71) Applicant: Workday, Inc., Pleasanton, CA (US)

(72) Inventor: Eric S. Chan, Fremont, CA (US)

(73) Assignee: Workday, Inc., Pleasanton, CA (US)

( * ) Notice: Subject to any disclaimer, the term of this patent is extended or adjusted under 35 U.S.C. 154(b) by 183 days.

(21) Appl. No.: 17/579,310

(22) Filed: Jan. 19, 2022

(51) Int. Cl.
*G06F 11/07* (2006.01)
*G06F 11/30* (2006.01)
*G06F 11/34* (2006.01)
*G06F 11/3604* (2025.01)

(52) U.S. Cl.
CPC ........ *G06F 11/076* (2013.01); *G06F 11/0778* (2013.01); *G06F 11/3006* (2013.01); *G06F 11/3466* (2013.01); *G06F 11/3616* (2013.01)

(58) Field of Classification Search
None
See application file for complete search history.

(56) References Cited

U.S. PATENT DOCUMENTS

| | | | |
|---|---|---|---|
| 9,021,448 B1 * | 4/2015 | Gagliardi | G06F 8/70 717/133 |
| 9,692,662 B2 | 6/2017 | Chan | |
| 10,333,798 B2 | 6/2019 | Chan | |
| 10,417,111 B2 | 9/2019 | Chan | |
| 11,256,604 B2 * | 2/2022 | Agarwal | G06F 11/3624 |
| 11,360,821 B1 | 6/2022 | Dey | |
| 2003/0212926 A1 | 11/2003 | Bhat | |
| 2004/0243593 A1 * | 12/2004 | Stolte | G06F 40/177 |
| 2004/0250170 A1 | 12/2004 | Glerum | |
| 2005/0028157 A1 | 2/2005 | Betancourt | |
| 2008/0126878 A1 * | 5/2008 | Best | G06F 11/3636 714/E11.181 |
| 2012/0054472 A1 * | 3/2012 | Altman | G06F 11/3419 712/E9.032 |
| 2014/0181593 A1 | 6/2014 | Smith | |
| 2014/0310714 A1 * | 10/2014 | Chan | G06F 16/285 718/102 |
| 2015/0254172 A1 | 9/2015 | Baril | |
| 2015/0254330 A1 * | 9/2015 | Chan | G06F 16/273 707/613 |
| 2015/0347263 A1 * | 12/2015 | Chau | G06F 11/36 717/130 |
| 2016/0182328 A1 * | 6/2016 | Bhasin | H04L 43/067 709/224 |
| 2017/0126580 A1 * | 5/2017 | Lo | H04L 43/065 |
| 2017/0371765 A1 | 12/2017 | Gadi | |
| 2021/0109844 A1 * | 4/2021 | Allyn | G06F 11/3037 |
| 2021/0334139 A1 | 10/2021 | Chan | |
| 2022/0019467 A1 | 1/2022 | Chan | |

* cited by examiner

*Primary Examiner* — Andrew M. Lyons
(74) *Attorney, Agent, or Firm* — Cooper Legal Group, LLC

(57) ABSTRACT

A method, system, and device for profiling execution of a set of code is disclosed. The method includes obtaining a plurality of thread dumps, determining a relational model based at least in part on the plurality of thread dumps, and determining, based at least in part on the relational model, latency information pertaining to execution of at least part of the set of code.

21 Claims, 12 Drawing Sheets

PERFORMANCE PROFILING OF CLOUD HOSTED SERVICES

BACKGROUND OF THE INVENTION

A system for business transactions management, reporting, analytics, planning, and operational (accounting, inventory, customer, etc.) data processing comprises a system for receiving data, storing data, processing data, etc. Such integrated systems hosted in the cloud typically include executing a large number of tasks in one or more services, and such systems typically involve continuous integration, deployment, and automated testing using a large number of datasets in a large number of runtime environments simulating the production environments. Among these services, the reporting and analytics services can use significant processing resources and significant volume and variety of datasets in connection with running code or applications to process and analyze data. The steadily increasing number of tenants, volume of business transactions, and size of datasets hosted in the cloud services at scale causes organizations to seek configurations of such services that optimize execution of a set of code and/or resource utilization of a set of code to identify potential further optimizations. Most automated test systems for testing execution of code/applications do not test for performance or efficiency.

BRIEF DESCRIPTION OF THE DRAWINGS

Various embodiments of the invention are disclosed in the following detailed description and the accompanying drawings.

DETAILED DESCRIPTION

Figure 1:
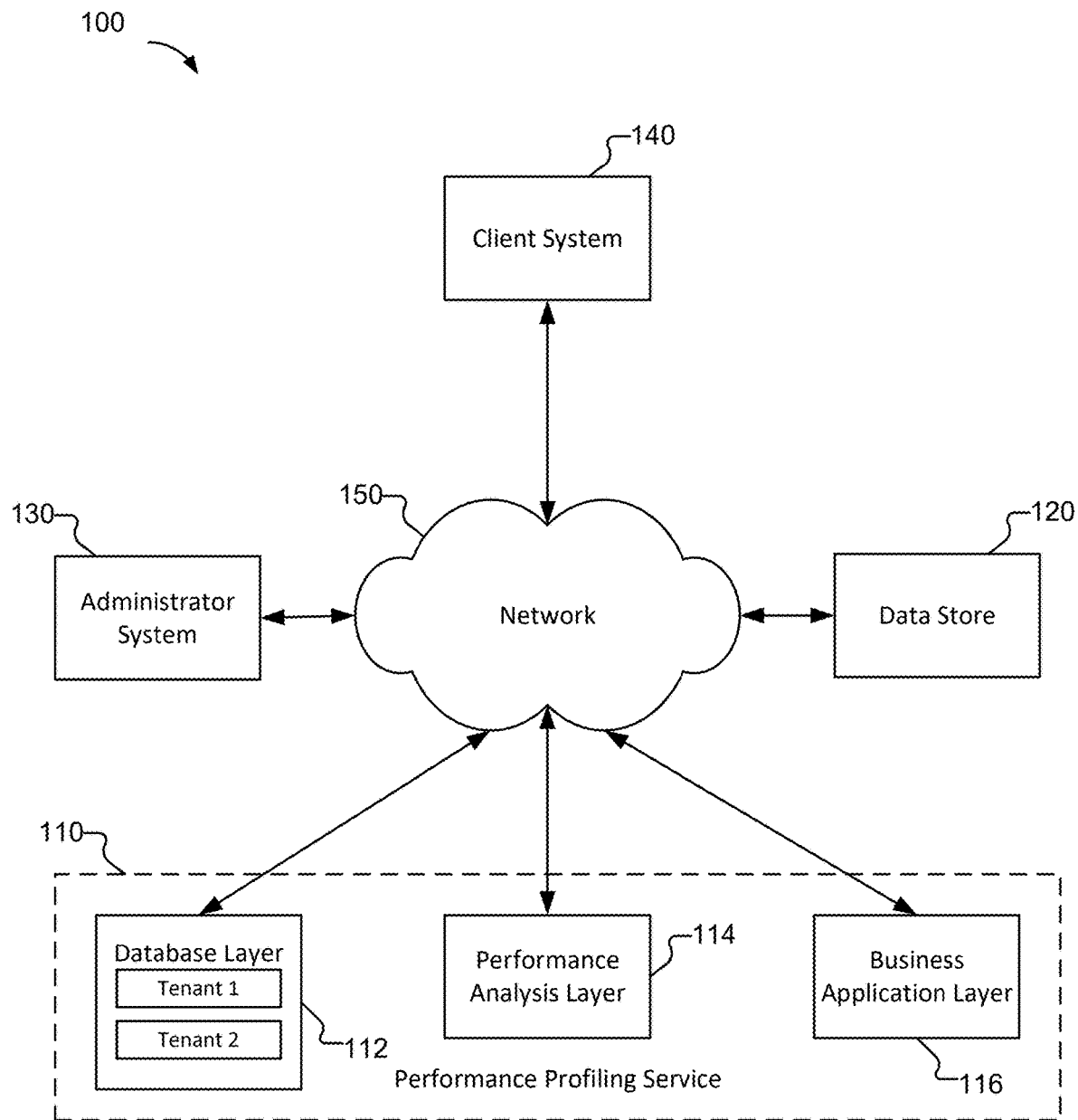
FIG. 1 is a block a diagram of a performance profiling system according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, thread intensity means a number of observed occurrences in a set of thread dumps corresponding over a particular period of time (e.g., where the thread dumps are sampled at a particular frequency). For example, if a first number of occurrences of a measurement such as a stack trace in the set of thread dumps over a period of time is equal to 20 occurrences in connection with a first sample set, and a second number of occurrences of a measurement such as a stack trace in the set of thread dumps over a period of time is equal to 10 occurrences in connection with a second sample set, the first sample set has a higher thread intensity for the measurement (e.g., the stack trace). A number of occurrences measured across different lengths of time can be normalized or otherwise compared based on a conversion based on a relationship between a frequency (e.g., arrival rate) of occurrences and a duration (e.g., latency) of the occurrences. The thread intensity (e.g., the number of observed occurrences) represents the offered load on the processors and resources over a length of time. The offered load increases when the frequency of occurrences increases and/or the duration of occurrences increases.

Higher offered load represents higher utilization of central processing unit (CPU), memory, and other system resources. The thread intensity or number of observed occurrences of a set of code is used as a proxy for the measurements of the performance and efficiency for execution of the set of code.

As used herein, a thread means a flow of control in an execution of a task. A thread can be a concurrent subtask of the task. Examples of tasks include a business transaction or a reporting task such as a purchase order task, an expense approval task, a payroll payment task, a business intelligence report task, a financial report task, etc.

As used herein, a tenant may be an organization associated with a database (or dataset), such as a client of a software as a service provider. The tenant may be a company, a government entity, a sub-organization (e.g., a department, business unit, etc.), or other appropriate organization, etc. Each tenant may be comprised in a computing environment (also referred to herein as an "environment"). Each tenant may be architecturally unique, and each environment may have different computing resources with a particular configuration. An environment may comprise one or more tenants.

A system and method for profiling performance of a service and/or for performing analytics on latency information is disclosed. In some embodiments, the latency information is determined based at least in part on a plurality of thread dumps that are dumped during execution of a set of code. A relational model may be determined (e.g., derived) based at least in part on the plurality of thread dumps and used to classify and quantify the execution of a set of code. For example, the set of the plurality of thread dumps can be used as a proxy for latency information for execution of the set of code.

According to various embodiments, the system causes a thread dump to be performed during execution of a set of code (e.g., during the execution of a plurality of threads). The system can cause a machine or application to invoke the thread dump. In some embodiments, the system configures at least part of the set of code to perform a thread dump into a log.

In some embodiments, determining the relational model based at least in part on a thread or thread dump uses a set of subtasks/calls used in connection with performing a task or executing a call. For example, performance of a task can include various different processes and calls to different frameworks or layers of frameworks of a system. Examples of frameworks that can be invoked in connection with executing a task include a task dispatcher framework, a task scheduler framework, a task orchestrator framework, a transaction management framework, a persistency framework, a framework for executing business logics, a report writer framework, an analytics calculation framework, a messaging framework, etc. The frameworks (or calls to the framework) can be represented in a thread as a set of states or calls in the thread dumps. According to various embodiments, a particular framework corresponds to a particular pattern of states, calls, or processes. For example, a particular framework has a corresponding pattern of a sequence of states. In some embodiments, the system stores a mapping of a particular pattern of states, calls, or processes to frameworks or sets of code (or subsets of code). For example, the system stores a mapping of a sequence of states to frameworks. As another example, the system stores a mapping of a sequence of states to sets of code. The system can use the mapping of the sequence of states to frameworks to determine performance (e.g., one or more performance characteristics) pertaining to a part of code or a framework.

According to various embodiments, information pertaining to performance of the execution of a set of code is obtained by aggregating a measure of the sequence of states or calls and a plurality of datasets derived in part from thread dumps that respectively measure performance across at least one different dimension. A plurality of datasets associated with the tasks include a transaction management task statistics dataset, a concurrent operations dataset, a resource allocation statistics dataset, a garbage collector statistics dataset, a query engine statistics dataset. In some embodiments, aggregating the measure of the sequence of states or calls and a plurality of datasets involves merging a plurality of tables representing the relational model or relational dataset that includes a plurality of dimension columns to identify the members of dimensions and a plurality of measure columns to provide the measurements. In some embodiments, aggregating a measure of the sequence of states or calls and a plurality of datasets involves joining a plurality of tables for dimensions, providing the attributes of the members of the dimensions. In some embodiments, the relational model comprises a data cuboid that relates the dimensions and measures. In some embodiments, the data cuboids can be arranged in a lattice of cuboids. In some embodiments, the dimensions or attributes of the dimensions represent the independent variables and the measures represent the dependent variables of the multi-variate functions. For example, the aggregate measures of the sequence of states or calls and a plurality of datasets can be split (e.g., or drilled-down) into measures for each member of a product dimension (e.g., Human Resource Management Core, Financial Management Core, Payroll Management Core, Time Tracking, Recruiting, Benefits, Procurements, Expenses, Settlements, etc.) to quantify the measurements for different products. In some embodiments, the measure of the sequence of states or calls and a plurality of datasets can be aggregated (e.g., rolled up) into information pertaining to a specific subset of dimensions providing the performance characteristic of a specific group of tasks. Composite information corresponding to the aggregated measure of the sequence of states or calls and a plurality of datasets (also referred to herein as "composite information") can be manipulated (e.g., filtered) to obtain one or more performance characteristics associated with executing the set of code. In various embodiments, the measure of the sequence of states or calls and the plurality of datasets are rolled up along a dimension corresponding to a request identifier (e.g., a request for execution of a task), a date, an hour of the day, a week number, a month identifier, a year, or any other appropriate parameter. Various other dimensions can be implemented to roll up the measure for the sequence of states or calls and the plurality of datasets. Examples of a dimension over which the measure for the sequence of states or calls and the plurality of datasets can be aggregated include: a customer identifier, a tenant identifier, a product identifier, a task definition identifier, a report definition identifier, a business object identifier, a data source identifier, a host computer server, a virtual machine server, a cluster of servers, an environment, a data center, a tenant's production, implementation, sandbox configuration, etc.

According to various embodiments, a dashboard is configured to provide information pertaining to performance of executing a set of code and the offered load on the processors and resources. In some embodiments, the system uses the composite information to provide information to the dashboard (e.g., for displaying to a user). For example, the dashboard is provided on a user interface (e.g., a user interface that is displayed at a client system). In some embodiments, the system manipulates (e.g., filters) the composite information based at least in part on one or more parameters. The one or more parameters may be configured by a user (e.g., based on user input). For example, a user can configure the one or more parameters (e.g., a user selects by inputting a selection of the one or more parameters) contemporaneous with viewing data (e.g., on a user interface). As another, the one or more parameters may be pre-configured (e.g., by an administrator, by a developer such as a developer of a pre-configured report, etc.). In some embodiments, the one or more parameters for manipulating (e.g., filtering) the composite information may include a dimension along which the composite information is to be sliced or filtered. In some embodiments, filtering the composite information may be used for continuous or periodic (e.g., high frequency, etc.) profiling and/or diagnostics of applications that are deployed in a service. The profiling and/or diagnostics may provide operational insights that inform optimization of corresponding code, etc. such as to tune the systems/service (e.g., inform developers and other users for development of improved code).

According to various embodiments, information used as input data to latency information or performance information is obtained based at least in part on a plurality of thread dumps that are dumped during execution of a set of code. For example, an input data to the composite information (e.g., input data to at least one of a measure for the sequence of states or calls and the plurality of datasets from which composite data is determined) is obtained from a plurality of thread dumps that are dumped during execution of the set of code. Performing thread dumps is generally a low overhead mechanism to obtain information during execution of the set of code. Accordingly, using information from a plurality of thread dumps in connection with determining a relational model and/or determining composite information (e.g., to provide performance profiling and diagnostic information) is an effective and low overhead technique for obtaining insight into performance of execution of a set of code. According to various embodiments, a sampling period according to which thread dumps are dumped may be configured according to an overhead that is acceptable (e.g., a QoS or overhead threshold value that is configurable). For example, thread dumps may be taken every 1 minute, every 5 minutes, etc. Various other frequencies may be used in connection with taking thread dumps.

According to various embodiments, a plurality of thread dumps is transformed into a relational model (e.g., a user defined relational model). The transformation of the plurality of thread dumps to the relational model includes determining a state transition model (e.g., a state transition model during execution of a set of code, such as a state transition of the set of code in a task executed by a virtual machine). In some embodiments, the system uses the states and events of the state transition model to transform the thread dumps to the relational model. The plurality of thread dumps capture the method chains that comprise control flows in a software framework (e.g., the set of code being executed), and high intensity methods of components of code and/or input/output components such as sockets and storage devices.

In some embodiments, a state represents a particular condition that a method chain has reached at a specific time. A method chain of a thread is associated with a sequence of states in a state transition history. A relation model is derived from a projection of the set of states in the state transition history. A state transition history corresponds to a relation in the relational model. A state corresponds to a dimension column of the relational model and a state transition event that causes a transition from a first state to a second state (e.g., another state or same state) corresponds to the value of the corresponding dimension column. The events that cause a transition from a state are the methods or method chains that constitutes the members of the dimension of the corresponding state. A state can correspond to invocation of a task, subtask, operation, process, and framework.

In some embodiments, the system obtains information pertaining to a plurality of thread dumps, determines a thread intensity of one or more states (or sequence of states) based at least in part on the information pertaining to a plurality of thread dumps, and determines one or more performance characteristics with respect to performing a set of code based at least in part on determining a thread intensity of one or more states. For example, the system determines a subset of code or framework respectively corresponding to a thread intensity of one or more states (or sequence of states). The system can determine a state trace for execution of a thread based at least in part on the information pertaining to the plurality of thread dumps. In some embodiments, the system translates/transforms the thread intensity to a latency ratio. In some embodiments, the system determines one or more patterns of the one or more states (e.g., one or more sequences of states) based at least in part on the information pertaining to a plurality of thread dumps or the intensity of one or more states (or sequence of states). The system can determine a subset of code or framework respectively corresponding to the one or more patterns of the one or more states. For example, the system performs a lookup against a mapping of patterns to frameworks or sets of code (e.g., a mapping of a sequence of states to frameworks, etc.) in connection with determining subset of code or framework respectively corresponding to the one or more patterns of the one or more states.

According to various embodiments, the system obtains information pertaining to a first plurality of thread dumps dumped (e.g., taken) with respect to a set of code executed during testing of a release candidate before deployment, and obtains information a second plurality of thread dumps dumped (e.g., taken) with respect to the set of code executed in a deployed environment (e.g., a deployment across a service or a plurality of services in a production environment, such as at scale, etc.). The system can determine one or more performance characteristics with respect to the first plurality of thread dumps, and the second plurality of thread dumps. For example, the system can compare the performance profile of the execution of a set of code in a release candidate version versus a set of code in a production version in similar environments (e.g., a pool of comparable machines used for release testing). Accordingly, a developer can use the performance profile or the comparison in connection with assessing performance of a set of code in the release candidate in the test environments before they are deployed to production environment, to identify any new bottlenecks (e.g., high latency parts of the set of code are deemed a bottleneck), etc., that should be fixed before the release candidate is deployed to production environment. In some embodiments, a part of the set of code is determined to be the bottleneck in the set of code in response to determining that a relative amount of the plurality of thread dumps comprises information indicating that a last state of a thread corresponds to the part of the set of code. In some embodiments, the relative amount of the plurality of thread dumps corresponds to a number of thread dumps that exceeds a predetermined threshold number of thread dumps. In some embodiments, the relative amount of the plurality of thread dumps corresponds to a percentage of thread dumps of the plurality of thread dumps that exceeds a threshold percentage of thread dumps. In some embodiments, the relative amount of the plurality of thread dumps corresponds to a percentage of thread dumps of a subset of the plurality of thread dumps over a predetermined amount of time exceeds a threshold percentage of thread dumps.

According to various embodiments, information pertaining to a plurality of thread dumps is obtained, and the information pertaining to the plurality of thread dumps comprises information indicating the state or call at the top of the stack. The stack can be deemed to represent a method chain (e.g., for a thread). For example, the stack may be deemed to be representative of operations (e.g., all operations) invoked during execution of a thread. The top of the stack can be deemed to be a method or an operation associated with a thread that is running. For example, a state or call may be the last element pushed to the top of the stack. The last element pushed to the top of the stack can be used to determine (e.g., infer) a state of the thread with respect to execution of a set of code, state of a machine processing the set of code, etc.

A stack is usually represented in computers by a block of memory cells, with the "bottom" at a fixed location, and the stack pointer holding the address of the current "top" cell in the stack. The top and bottom terminology may be used regardless of whether the stack grows (e.g., a number of elements in the stack increases, etc.) towards lower memory addresses or towards higher memory addresses. Pushing an item on to the stack adjusts the stack pointer by the size of the item (either decrementing or incrementing, depending on the direction in which the stack grows in memory), pointing it to the next cell, and copies the new top item to the stack area. As an example, a bottom of the stack corresponds to a base from which the thread begins running.

According to various embodiments, information from a set of thread dumps (e.g., taken during execution of a set of code) is used to determine latency information such as latency information pertaining to execution of the set of code. For example, the system analyzes the information from a set of thread dumps in connection with determining latency information. Each task has its own associated dimensions. The information pertaining to the top of the stack is one dimension over which information pertaining to the obtained plurality of thread dumps or composite information is measured. The set of thread dumps and thread intensity or number of observed occurrences of a set of code thereof, may be a proxy for latency information such as for determining a latency with respect to a subtask/operation during execution of a thread (e.g., a set of code). The offered load or latency may be determined as a percentage (e.g., a qualitative representation) because of the use of the set of thread dumps as effective snapshots of the state of the execution of the set of code (e.g., a snapshot of the top of the stack at the time that the thread dump was taken), etc. During the lifecycle of a task, an operation takes up a certain percentage of time (e.g., a percentage of a time to perform the entire task such as the task for which latency is being measured).

A task (e.g., a definition of the task for which latency is being measured) may be dependent on the level of abstraction or aggregation. For example, a task may be generating a report such as a report of salary information for employees of a company. As another example, the task may be executing a calculation framework to perform one or more computations with respect determining information to be comprised in a requested report. As another example, the task may be executing a report writer framework on the journal lines to generate a financial report, etc. A task may include a plurality of different subtasks, frameworks, operations, or queries. The use of information pertaining to a plurality of thread dumps to determine latency information may comprise determining a percentage of time associated with a particular operation or query (e.g., each operation or query) relative to an overall time for processing the task. In some embodiments, the system determines relative percentages of time that processing of a thread spends among the various operations (e.g., queries, information retrievals, searches, translations, calculations, encryptions, decryptions, compression, decompressions, serializations, deserializations, resource allocations, etc.). The system can identify operations that contribute a larger percentage of time. As an example, the system may identify operations contributing a larger percentage of time to identify those operations for which optimizing may see the most gains. As an example, the system may identify operations contributing a larger percentage of time to identify bottlenecks associated with processing a task.

Various embodiments cause a plurality of thread dumps to be taken in connection with one or more of: (i) executing different sets of code, (ii) executing a particular set of code over different datasets, (iii) running a dataset through a set of code, (iv) executing a particular set of code in different hardware environments/configurations, (v) executing a particular set of code in different deployments, etc. In some embodiments, the system obtains information pertaining to the thread dumps to determine a percentage of time spent running different portions of a particular set of code. The system may build a profile for executing the set of code in a particular context (e.g., a certain tenant, a certain dataset, certain environment or configurations, a certain time period, a certain version, etc.). In some embodiments, the system compares profiles for executing the set of code across different contexts in connection with determining anomalies, optimizations and/or constraints (e.g., bottlenecks) associated with executing the set of code. For example, the system can identify a hardware constraint that may need scaling of the hardware allocations. As another example, the system can identify a sub-optimal part of the set of code that is causing relatively large latency. As another example, the system identifies causes for a change in latency, a latency regression, or a performance regression based at least in part on the comparison of the profiles for executing the set of code across different contexts. As another example, the system identifies changes in the intensity of offered load due to seasonality that may need proactive expansion of hardware capacity. If a machine/system was able to execute the set of code within an expected period of time, and a subsequent execution of the set of code causes the machine/system to take 150% the expected time, such a performance regression may be caused by a bug being introduced into the set of code (e.g., based on a modification to the code during development/updating). The system can identify the anomaly and provide a notification of the anomaly (e.g., of the performance regression). The system may determine an anomaly or performance regression based on one or more preset thresholds (e.g., a statistics threshold that can be configured by a user such as an administrator or developer). In some embodiments, in response to detecting an anomaly/performance regression, the system triggers an action, alert, notification, log record, timeout, etc., of execution of the corresponding set of code. For example, if a latency takes a defined time longer than expected, the system triggers a timeout of the corresponding operation. Examples of thresholds used to identify an anomaly/performance regression include at least 300% of an expected time, at least 200% of an expected time, at least 150% of an expected time, at least 120% of an expected time. Various other thresholds may be implemented, or otherwise configured by a user. In some embodiments, in response to the alert after detecting an anomaly/performance regression, the system re-executes the task for the corresponding task definition using another version of the set of code by changing a toggle state to select another version of the set of code. In some embodiments, in response to detecting an anomaly/performance regression, the system executes the subsequent tasks of the corresponding task definition using another version of the set of code by changing the toggle state to select another version of the set of code.

In some embodiments, the system analyzes latency information (e.g., relative latencies) for stack frame. The system may determine whether a particular last state or last stack frame (method call on the top of the stack) is dominant among the various last states or last stack frames within the plurality of thread dumps for which information is being analyzed. In response to determining that the particular last state or last stack frame is dominant, the system may deem that the execution of the code is stuck in that state or method call. For example, the system may trigger an action, alert, notification, log record, timeout, etc., based at least in part on a determination that a particular last state or last stack frame is dominant among the last states or last stack frames within the plurality of thread dumps, and that the current last state or the last stack frame is the particular dominant last state or last stack frame. As example, the system may trigger an action, alert, notification, log record, timeout, etc., based at least in part on a determination that a particular last state or last stack frame is dominant among the last states or last stack frames within the plurality of thread dumps, and the current thread intensity measure, latency measure, number of observations of occurrences of the last state or last stack frame has been equal to or greater than the predefined thread intensity measure, latency measure, number of observations of occurrences of particular dominant last state or last stack frame. In some embodiments, the predefined thread intensity measure, latency measure, number of observations of occurrences may be set by a user. In some embodiments, the predefined thread intensity measure, latency measure, number of observations of occurrences is set based on a statistical analysis such as based on a thread intensity measure, latency measure, number of observations of occurrences above which the execution of the code being in that particular state would be anomalous. In some embodiments, in response to determining the particular last state or last stack frame is dominant or the execution of the code is stuck in that state, the system analyzes the state history to identify an earlier state in the state history that is associated with a toggle. Assessing that the stuck code is due to a performance regression in a version of the set of code, the system identifies another version of the set of code that will avoid the stuck state and avoid the performance regression. In some embodiments, in response to detecting an anomaly/performance regression, the system executes the current task and/or subsequent tasks of the corresponding task definition using another version of the set of code by changing the toggle state to select another version of the set of code.

According to various embodiments, the system analyzes the change in latency information over different dimensions. For example, the system analyzes the change in latency information over different dimensions to isolate an area/portion of code for a particular measurement. In some embodiments, the system isolates a portion of code causing a bottleneck or experiencing a performance regression (e.g., relative to an expected processing time, etc.). For example, the system isolates the top stack frame that contributes to performance regression (e.g., based on comparison of latency information of current execution of code with execution of a previous version of the code, such as before a portion of code is introduced, etc.).

According to various embodiments, the system uses the information obtained from the plurality of threads to determine a relational model comprising one or more dimensions. The system can drill down to analyze/determine information comprised in the relational model (e.g., latency information) along a dimension(s). For example, the drill down of dimension and/or filtering by a dimension of the information is based on user input or predetermined configurations such as a dashboard or report configuration. In some embodiments, the system characterizes an operation based on a drilling down and/or filtering of the information along different dimensions associated with an operation. For example, the system determines (e.g., analyzes) a thread intensity pertaining to a particular operation with respect to different dimension(s) of the operation. An anomaly may only be ascertainable from a subset of dimensions (e.g., a particular dimension of the operation) and not otherwise ascertainable from an aggregated view of latency information with respect to an operation. Accordingly, the system may detect an anomaly based on a filtering of latency information for an operation along a subset of dimensions of the operation. For examples, the system may determine that a particular last state or last stack frame is dominant for the financial report tasks that processes the Supplier Invoice lines by drilling down to the business object dimension and filtering down to the Supplier Invoice business object among the members of the business object dimension.

According to various embodiments, thread dumps are taken at predefined time intervals. In some embodiments, with respect to execution of code in a production environment, thread dumps are taken every 5 minutes. Various other time intervals may be implemented to take thread dumps. For example, decreasing the predefined time intervals increases resolution of the information pertaining to the thread dumps. Thread dumps may be taken every minute, every 30 second, every 5 seconds, etc. Alternatively or additionally, resolution of the information pertaining to the thread dumps can be increased by taking the plurality of thread dumps over a longer period (e.g., at a predefined time interval over a longer period of time, such as taking a thread dump every 5 minutes over a week), etc. In some embodiments, the thread dumps are taken according to a random sampling. According to various embodiments, the system uses information pertaining to a relative thread intensity in connection with determining latency information rather than an absolute intensity. In some embodiments, latency information is determined by determining one or more operation times for a plurality of operations associated with executing a set of code.

According to various embodiments, a thread dump comprises information pertaining to an operation performed in connection with execution of a set of code. For example, the thread dump indicates a last stack frame (e.g., a last method call pushed to the top of the stack during processing a task) at a time (e.g., a respective time) that the thread dump is taken. Various other information may be captured in the thread dump. For example, the system can cause a machine or execution of code to dump additional/other information such as to provide greater resolution to execution of the code. Examples of information that can be captured in a thread dump include a task identifier being invoked, a user identifier associated with a task (e.g., an anonymized identifier), a task definition (e.g., a task being invoked by the end user), a retaining (e.g., resources such as memory, database connections, locks, etc., being held or used by a thread at a time the thread dump is taken), business object definition, persistent object identifier, etc. In some embodiments, aggregating and analyzing the memory or resource usage measurement information obtained from the plurality of thread dumps and filtering or drilling-down along various dimensions can indicate a maximum memory usage of various set of code in the threads. The system can allocate resources based on the analysis of the maximum memory usage during the execution of a thread (e.g., if memory is a constraint during execution of code, the system can identify the constraint based on memory usage information obtained from the thread dumps). The system can subsequently allocate appropriate resources for performance of the thread such as increasing memory reserved for the thread.

Related art systems for measuring latency and/or resource utilization generally require a lot of associated overhead. The overhead associated with measuring latency and/or resource utilization according to related art systems impacts the quality of service for users. Accordingly, various embodiments improve the measuring of latency (e.g., latency associated with executing a set of code) and measuring of resource utilization (e.g., CPU or memory required for executing a set of code). The use of information obtained from a plurality of thread dumps may be a low overhead manner to determine latency and/or resource utilization information.

In some embodiments, the system improves the computer by enabling better measurement of problems in execution of the system and/or system components. Specifically, the system can identify anomalous amounts of time spent in execution of a specific thread, pattern of threads, pattern of operations, code, set of code, etc. and trigger an action, a warning, indicate a warning, indicate a termination of an operation, indicate a termination of a task, indicate a re-execution of an operation or task by switching the toggles for an alternative sets of code, indicate automatic redistribution of a task to alternative servers, etc. In addition, the system can improve operation of a thread, a task, a piece of code, a set of code, in identifying longer times spent in specific parts of the execution to identify those areas of the thread, process, piece of code, or the set of code that can be optimized for execution (e.g., speeding the operation, substituting operation, restructuring for speed, etc.).

FIG. 1 is a block a diagram of a performance profiling system according to various embodiments of the present application.

In the example illustrated in FIG. 1, system 100 includes performance profiling service 110, data store 120, administrator system 130, and/or client system 140. In some embodiments, performance profiling service 110 and data store 120, are integrated (e.g., combined into a layer or a single set of server(s)). In some embodiments, performance profiling service 110 comprises database layer 112, performance analysis layer 114, and/or business application layer 116. System 100 further includes one or more networks such as network 150 over which administrator system 130 and/or client system 140 communicates with performance profiling service 110, and/or data store 120. In various embodiments, network 150 includes one or more of a wired network, and/or a wireless network such as a cellular network, a wireless local area network (WLAN), or any other appropriate network. In some embodiments, database layer 112, performance analysis layer 114, and/or business application layer 116 are respectively implemented by one or more servers. System 100 may include various other systems or terminals.

Performance profiling service 110 stores (or accesses) information pertaining to the one or more thread dumps and profiles performance of a service (e.g., execution of a set of code, an application, etc.) based at least in part on information pertaining to the one or more thread dumps. In some embodiments, performance profiling service 110 profiles the performance of the service in connection with development of code and/or improvement (e.g., optimization) of code currently deployed (e.g., in a production environment). Performance profiling service 110 uses the information pertaining to the one or more thread dumps to obtain (e.g., determine) latency information with respect to performance of the service such as latency information pertaining to execution of a set of code. For example, performance profiling service 110 uses information pertaining to the one or more thread dumps (e.g., a thread intensity) as a proxy for, or a source for deriving, latency information. In some embodiments, performance profiling service 110 uses information pertaining to the one or more thread dumps to obtain (e.g., determine) one or more performance characteristics with respect to performing the service/executing a set of code. According to various embodiments, performance profiling service 110 uses information pertaining to the one or more thread dumps to obtain (e.g., determine) relative thread intensities with respect to one or more dimensions of tasks or subtasks (e.g., operations, etc.). The relative thread intensities are used in connection with profiling a service (e.g., determining a performance characteristic associated with executing a set of code).

According to various embodiments, performance profiling service 110 comprises database layer 112, performance analysis layer 114, and/or business application layer 116. Performance profiling service 110 uses database layer 112 to store one or more performance characteristics, a performance profile with respect to execution of a service/application/set of code, information pertaining to one or more thread dumps, a relational model, information pertaining to frameworks or sets of code (e.g., patterns, sequence of calls/operations, etc.). For example, database layer 112 stores a mapping of particular pattern of states, calls, or processes to frameworks or sets of code (or subsets of code) such as a mapping of a sequence of states to frameworks, etc. Database layer 112 services queries received in connection with execution of a service/application/set of code such as by an application running on business application layer 116.

A service for which performance is profiled can be deployed via database layer 112. For example, an application (e.g., a set of code) comprised in business application layer 116 invokes database layer 112 in connection with accessing one or more datasets stored in data store 120. In some embodiments, an application (e.g., the set of code) for which performance is profiled is invoked (e.g., executed in business application layer 116). As an example, performance profiling service (e.g., performance analysis layer 114) causes the service/application/set of code to perform a thread dump during execution. As another example, the set of code being invoked (e.g., executed) at business application layer is configured to perform thread dumps during execution. The thread dump may be taken at predefined intervals, at random times, etc. In some embodiments, the service/application/set of code that performs the thread dumps is executed in a different service (e.g., among a different set of one or more servers). For example, performance profiling service 110 obtains a plurality of thread dumps corresponding to a service/application/set of code executed by a different system.

According to various embodiments, performance profiling service 110 uses performance analysis layer 114 to obtain information pertaining to a plurality of thread dumps and to determine one or more performance characteristics with respect to execution of a corresponding service/application/set of code. In some embodiments, performance analysis layer 114 determines a relational model based at least in part on the plurality of thread dumps (e.g., on the information pertaining to a plurality of thread dumps). Performance analysis layer 114 uses the relational model in connection with determining the one or more performance characteristics. For example, performance analysis layer determines relative thread intensities, relative latencies, etc. based at least in part on the relational model.

In some embodiments, performance analysis layer 114 aggregates a measure of the sequence of states or calls and the plurality of datasets which respectively measure performance across at least one different dimension. The measure of the sequence of states or calls and the plurality of datasets can comprise information pertaining to the plurality of thread dumps (e.g., taken during execution of a service/application/set of code, etc.). In some embodiments, the aggregating the measure of the sequence of states or calls and the plurality of datasets includes merging and joining a plurality of tables to obtain a relational dataset. For example, performance analysis layer 114 rolls up a measure of the sequence of states or calls and the plurality of datasets along a dimension corresponding to a request identifier (e.g., a request for execution of a task, a subtask, an operation, etc.), a date, an hour of the day, a week number, a month identifier, a year. Various other dimensions can be implemented roll up the measure the sequence of states or calls and the plurality of datasets. Examples of a dimension over which the measure for the sequence of states or calls and the plurality of datasets can be aggregated include: a customer identifier, a tenant identifier, a product identifier, a task definition identifier, a report definition identifier, a business object identifier (e.g., an application identifier such as an identifier for a jvm app), a data source identifier, a host computer server, a virtual machine server, a cluster of servers, an environment, a data center, a tenant's production, implementation, sandbox configuration, etc.

In some embodiments, performance profiling service 110 uses performance analysis layer 114 to profile execution performance of a set of code. The performance analysis layer 114 profiles the performance across different contexts. For example, a set of code is executed in different contexts, a corresponding plurality of thread dumps with respect to the execution of the code in the different contexts is obtained, and a set of one or more performance characteristics are determined based at least in part on information pertaining to the plurality of thread dumps. Examples of different contexts include: (i) executing different sets of code, (ii) executing a particular set of code over different test datasets, (iii) running a dataset through a set of code, (iv) executing a particular set of code in different hardware environments/configurations, (v) executing a particular set of code in different deployments, etc. In some embodiments, the system obtains information pertaining to the thread dumps to determine a percentage of time spent running different portions of a particular set of code. The system may build a profile for executing the set of code in a particular context (e.g., a certain dataset, certain environment or configurations, a certain time period, etc.). Various other contexts may be implemented. As an example, executing a service/application/set of code with respect to tenant 1 and tenant 2 of database layer 112 corresponds to executing the service/application/set of code in different contexts. In some embodiments, tenant 1 and tenant 2 of database layer 112 comprises a same configuration (e.g., a same environment). In some embodiments, tenant 1 and tenant 2 of database layer 112 comprises different configurations (e.g., different environments). In some embodiments, tenant 1 and tenant 2 of database layer 112 use different datasets stored in data store 120. As another example, a same service/application/set of code is executed with respect to tenant 1 of database layer 112 based on a same dataset. However, same service/application/set of code is executed at different times. The different times correspond to different contexts.

Performance analysis layer 114 transforms information pertaining to a plurality of thread dumps (e.g., information captured from thread dumps) into a relational model (e.g., a user defined relational model). Using information from a plurality of thread dumps in connection with determining a relational model and/or determining composite information (e.g., to provide performance profiling and diagnostic information) is an effective and low overhead technique for obtaining insight into performance of execution of a set of code. The transformation of the plurality of thread dumps to the relational model includes performance analysis layer 114 determining a state transition model (e.g., a state transition model during execution of a set of code, such as a state transition of the set of code in a task executed by a virtual machine). In some embodiments, performance analysis layer 114 uses the states and events of the state transition model to transform the thread dumps to the relational model. The plurality of thread dumps capture the method chains that comprise control flows in a software framework (e.g., the set of code being executed), and high intensity methods of components of code and/or input/output components such as sockets and storage devices.

The determining the relational model includes determining thread intensities with respect to one or more dimensions or parameters of the service/application/set of code executed (and being profiled). For example, performance analysis layer 114 determines thread intensities with respect to a state of the processing service/application/set of code such as based on an indication of a task (or subtask, operation, etc.) that is at a top of the stack when the corresponding thread dump is taken. According to various embodiments, performance analysis layer 114 obtains information pertaining to a plurality of thread dumps, determines a thread intensity of one or more states (or sequence of states) based at least in part on the information pertaining to a plurality of thread dumps, and determines one or more performance characteristics with respect to performing a set of code based at least in part on determining a thread intensity of one or more states. For example, performance analysis layer 114 determines a subset of code or framework respectively corresponding thread intensity of one or more states (or sequence of states). In some embodiments, performance analysis layer 114 determines a state trace for execution of a thread based at least in part on the information pertaining to the plurality of thread dumps (e.g., where the state trace can correspond to a series of states or processes or a pattern of states in a stack dump indicating a particular subset of code or code sequence). In some embodiments, performance analysis layer 114 translates/transforms the thread intensity to a latency ratio. In some embodiments, performance analysis layer 114 determines one or more patterns of the one or more states (e.g., one or more sequences of states) based at least in part on the information pertaining to a plurality of thread dumps or the intensity of one or more states (or sequence of states). In response to determining one or more patterns or sequences of states using the information captured via the plurality of thread dumps, performance analysis layer 114 determines a subset of code or framework respectively corresponding to the one or more patterns of the one or more states. For example, performance analysis layer 114 performs a lookup against a mapping of patterns to frameworks or sets of code (e.g., a mapping of a sequence of states to frameworks, etc.) in connection with determining subset of code or framework respectively corresponding to the one or more patterns of the one or more states.

According to various embodiments, information pertaining to a plurality of thread dumps are obtained, and the information pertaining to the plurality of thread dumps comprise information indicating the state or call at the top of the stack. The stack is deemed to represent a method chain (e.g., for a thread). For example, the stack is deemed to be representative of operations (e.g., all operations) invoked during execution of a thread. The top of the stack is deemed to be a method or an operation associated with a thread that is running. For example, a state or call may be the last element pushed to the top of the stack. The performance analysis layer 114 uses the snapshot to determine (e.g., infer) a state with respect to execution of a set of code, state of a set of code in a thread executed by a machine, etc. The information pertaining to the top of the stack is one of the dimensions over which information pertaining to the obtained plurality of thread dumps or composite information is measured. Performance analysis layer 114 uses information pertaining to a set of thread dumps (e.g., a thread intensity) as a proxy, or source, for latency information such as for determining a latency with respect to a subtask/operation during execution of a thread (e.g., a set of code). According to various embodiments, performance analysis layer 114 determines an offered load or latency as a percentage (e.g., a qualitative representation) because of the use of the set of thread dumps as effective snapshots of the state of the execution of the set of code (e.g., a snapshot of the top of the stack at the time that the thread dump is taken), etc. During the lifecycle of a task, an operation takes up a certain percentage of time (e.g., a percentage of a time to perform the entire task such as the task for which latency is being measured). Performance analysis layer 114 transforms information pertaining to the plurality of thread dumps to a measure (e.g., a performance characteristic) indicating a relative amount/percentage of time that a system spends processing a particular subtask, operation, etc.

In some embodiments, performance analysis layer 114 determines an expected performance profile (e.g., a set of one or more performance characteristics) with respect to a particular service/application/set of code. The expected performance profile can be based on a baseline or historical set of thread dumps. In some embodiments, performance analysis layer 114 uses the expected performance profile in connection with determining (e.g., identifying) whether performance regression is experienced in connection with executing the service/application/set of code at a later time (e.g., but in otherwise the same contexts). In some embodiments, performance analysis layer 114 compares profiles (e.g., performance profiles) for executing the set of code across different contexts in connection with determining anomalies, optimizations and/or constraints (e.g., bottlenecks) associated with executing the set of code. For example, performance analysis layer 114 identifies a hardware constraint by comparing a performance profile determined based on a set of thread dumps to an expected performance profile (e.g., determined using historical thread dumps). As another example, performance analysis layer 114 determines a sub-optimal part of the set of code that is causing relatively large latency. As another example, performance analysis layer 114 determines causes for a change in latency, a latency regression, or a performance regression based at least in part on the comparison of the profiles for executing the set of code across different contexts. If a machine/system was able to execute the set of code within an expected period of time (e.g., corresponding to a baseline or expected performance profile), and a subsequent execution of the set of code causes the machine/system to take 150% the expected time, such a performance regression may be caused by a bug being introduced into the set of code (e.g., based on a modification to the code during development/updating). Performance analysis layer 114 identifies an anomaly and provides a notification of the anomaly (e.g., of the performance regression). According to various embodiments, performance analysis layer 114 determines an anomaly or performance regression based on one or more preset thresholds (e.g., a statistics threshold that can be configured by a user such as an administrator or developer). In some embodiments, in response to detecting an anomaly/performance regression, performance analysis layer 114 triggers an action, alert, notification, log record, timeout, etc., of execution of the corresponding set of code. For example, if a latency takes a defined time longer than expected, performance analysis layer 114 triggers a timeout of the corresponding operation (e.g., an indication to terminate the operation, a timer set to wait a period of time prior to terminating the operation, etc.). Examples of thresholds used to identify an anomaly/performance regression include at least 300% of an expected time, at least 200% of an expected time, at least 150% of an expected time, at least 120% of an expected time. Various other thresholds may be implemented, or otherwise configured by a user. In response to the alert after detecting an anomaly/performance regression, the system re-executes the task for the corresponding task definition using another version of the set of code by changing the toggle state to select another version of the set of code. In some embodiments, in response to detecting an anomaly/performance regression, the system executes the subsequent tasks of the corresponding task definition using another version of the set of code by changing the toggle state to select another version of the set of code.

According to various embodiments, performance analysis layer 114 analyzes the change in latency information over different dimensions. Performance analysis layer 114 analyzes the change in latency information over different dimensions to isolate an area/portion of code for a particular measurement. In some embodiments, performance analysis layer 114 isolates a portion of code causing a bottleneck or experiencing a performance regression (e.g., relative to an expected processing time, etc.). For example, performance analysis layer 114 isolates the top stack frame that contributes to performance regression (e.g., based on comparison of latency information of current execution of code with execution of a previous version of the code, such as before a portion of code is introduced, etc.).

In some embodiments, performance profile service 110 receives a user input from a user. Examples of the user input include a configuration, a setting, a request to analyze (e.g., profile) performance of a service/application/set of code, an indication of one or more dimensions along which the analysis is to be performed, etc. Various other user inputs may be implemented. In some embodiments, performance profile service 110 receives the user input from a user using administrator system 130. In some embodiments, performance profile service 110 receives the user input from a user using client system 140.

In some embodiments, performance profile service 110 outputs information such as a performance profile to a user. As an example, the information is output to a user interface such as a user interface that administrator system 130 and/or client system 140 is caused to display. The user interface may be displayed in a web browser running at administrator system 130 and/or client system 140. In some embodiments, the information is output to (e.g., provided in the form of) a dashboard displayed on a user interface. According to various embodiments, a performance profile service 110 (e.g., performance analysis layer 114 and/or business application layer 116) configures a dashboard to provide information pertaining to performance of executing a set of code. In some embodiments, performance profile service 110 uses the composite information to provide information to the dashboard (e.g., for displaying to a user). In some embodiments, performance profile service 110 manipulates (e.g., filter) the composite information based at least in part on one or more parameters. The one or more parameters may be configured by a user (e.g., based on user input). For example, a user can configure the one or more parameters (e.g., input selection of the one or more parameters) contemporaneous with viewing data (e.g., on a user interface). As another, the one or more parameters are pre-configured (e.g., by an administrator, by a developer such as a developer of a pre-configured report, etc.). In some embodiments, the one or more parameters for manipulating (e.g., filtering) the composite information include a dimension along which the composite information is to be filtered. In some embodiments, the filtering the composite information is used for continuous or periodic (e.g., high frequency, etc.) profiling and/or diagnostics of applications that are deployed in a service. The profiling and/or diagnostics may provide operational insights that inform optimization of corresponding code, etc. such as to tune the systems/service (e.g., inform developers and other users for development of improved code).

According to various embodiments, performance profiling service 110 (e.g., performance analysis layer 114 and/or business application layer 116) provides a user interface via which a user discovers and/or accesses performance profiles (e.g., one or more performance characteristics of executing a set of code, etc.), anomalies or performance regressions identified by analyzing the plurality of thread dumps, etc. As an example, the web interface is provided as a web service such as on a page accessed by a user via client system 140.

According to various embodiments, business application layer 116 provides an interface via which a user (e.g., using client system 140) may interact with various applications such as a development application for developing a service, application, and/or code, an application to access raw data (e.g., data stored in data store 120), an application to analyze thread dumps (e.g., thread dumps taken during execution of code), an application to analyze performance profiles (e.g., one or more performance characteristics associated with a service, application, set of code, etc.), etc. Various other applications can be provided by business application layer 116. For example, a user queries database layer 112 by sending a query/request to business application layer 116, which interfaces with database layer 112 and/or data store 120 to obtain information responsive to the query (e.g., business application layer 116 formats the query according to the applicable syntax and send the formatted query to database layer 112). As another example, an administrator uses an interface provided/configured by business application layer 116 to configure (e.g., define) one or more security policies including access permissions to information stored on a data store 120, permission to access performance profiles, etc.

According to various embodiments, data store 120 stores raw data such as source data that is used to provide a service and/or to test a service/application/set of code. For example, the raw data is used in connection with generating a report. In some embodiments, the raw data comprises one or more datasets. Examples of raw data used in connection with an e-commerce implementation is a table comprising information pertaining to one or more users (e.g., zip code, address, payment methods, etc.), employee tables comprising information pertaining to one or more employees of an organization (e.g., title, name, salary, department, reports such as direct reports, manager, etc.), a finance table comprising information pertaining to finances of an organizations (e., expenses, sales, etc.). In some embodiments, performance profiling service 110 communicates with (e.g., accesses) data store 120 to obtain the raw data in connection with computing or updating a code or report being generated in database layer 112 and/or business application layer 116. For example, performance profiling service 110 performs profiling for the system.

According to various embodiments, system 100 comprises an administrator system 130 for use by an administrator such as an administrator of performance profiling service 110. For example, administrator system 130 comprises a system for communication, data access, computation, etc. An administrator uses administrator system 130 to maintain data store 120 (e.g. maintain raw data comprised in data store 120), to define and manage performance profiling applications and results (e.g., performance profiles) and access to profiling applications and results (e.g., performance profiles) at performance profiling service 110, and/or applications or code stored or running at business application layer 116. For example, an administrator uses administrator system 130 to define one or more security policies that are to be enforced with respect to an application, code, a performance profiling system, a performance profile (e.g., one or more performance characteristics), etc. Administrator system 130 communicates with performance profiling service 110 via a web-interface. For example, administrator system 130 communicates with performance profiling service 110 via a web-browser installed on administrator system 130. As an example, administrator system 130 communicates with performance profiling service 110 via an application running on administrator system 130.

According to various embodiments, system 100 comprises client system 140. Client system 140 is used by a user (e.g., a developer such as a developer of code, a developer of a profiling application, a developer of a reporting system/dashboard for performance profiles, etc.) to communicate with performance profiling service 110 and/or data store 120. As an example, client system 140 communicates with performance profiling service 110 via a web-interface. In some embodiments, a user uses client system 140 to develop code at performance profiling service 110, to modify a filter (e.g., dimension) over which composite information or information pertaining to a plurality of thread dumps is to be analyzed, to query database layer 112, etc.

In some embodiments, database layer 112, performance analysis layer 114, and/or business application layer 116 are implemented on a single server or a plurality of servers. For example, performance analysis layer 114 and database layer 112 are different modules running on a same server or set of servers. As another example, performance analysis layer 114 and business application layer 116 are different modules running on a same server or set of servers. In some embodiments, performance profiling service 110 and/or data store 120 are implemented on a single server or a plurality of servers.

Figure 2:
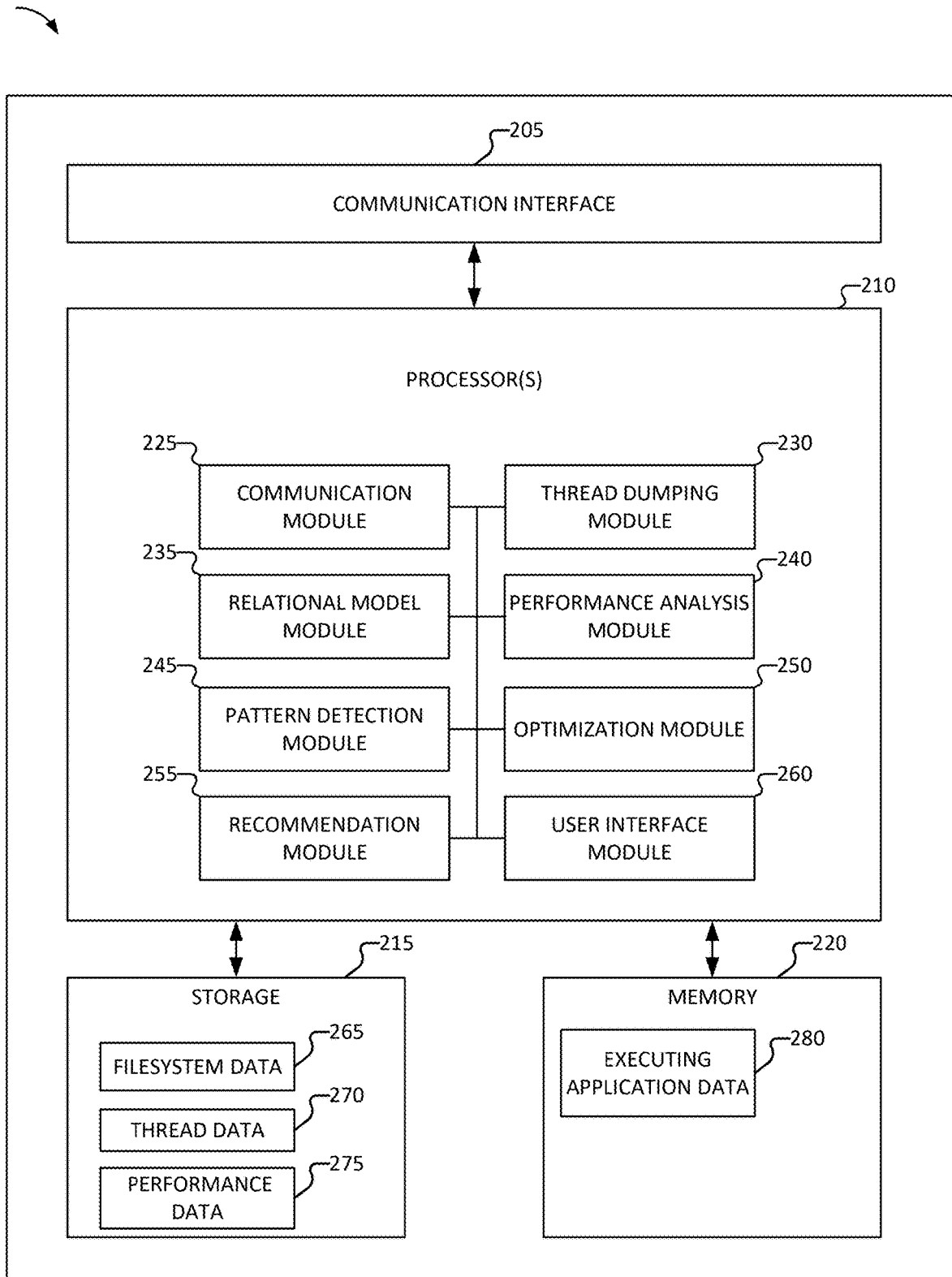
FIG. 2 is a block diagram of a performance profiling system according to various embodiments of the present application.

FIG. 2 is a block diagram of a performance profiling system according to various embodiments of the present application. In some embodiments, system 200 comprises, or corresponds to, performance analysis layer 114, business application layer 116, and/or database layer 112. System 200 may implement at least part of system 100 of FIG. 1, determine cuboid data model 300 of FIG. 3, configure feature vectors representation 400 of FIG. 4A, feature vectors representation 450 of FIG. 4B, configure time-series representation 500 of FIG. 5, and/or configure relative latency profiles representation 600 of FIG. 6. System may implement at least part of process 700 of FIG. 7, process 800 of FIG. 8, process 900 of FIG. 9, process 1000 of FIG. 10, and/or process 1100 of FIG. 11. Cuboid data model, feature vectors, time-series, relative latency profiles, etc., are various representations and visualizations of the relational data model. According to various embodiments, system 200 corresponds to, or comprises, a system for profiling performance of a service, execution of an application, and/or execution of a set of code.

In the example shown, system 200 implements one or more modules in connection with profiling performance of a service, execution of an application, and/or execution of a set of code, obtaining information pertaining to a plurality of thread dumps, transforming information pertaining to a plurality of thread dumps to a relational model and/or latency information, determining one or more performance parameters associated with the service or execution of the application and/or the set of code, performing a regression analysis with respect to the latency information or information pertaining to a plurality of thread dumps, detecting anomalies and/or performance regressions with respect to the service or execution of the application and/or the set of code, configuring a report or dashboard (e.g., with a performance profile), etc. System 200 comprises communication interface 205, one or more processors 210, storage 215, and/or memory 220. One or more processors 210 comprises one or more of communication module 225, thread dumping module 230, relational model module 235, performance analysis module 240, pattern detection module 245, optimization module 250, recommendation module 255, and/or user interface module 260.

In some embodiments, system 200 comprises communication module 225. System 200 uses communication module 225 to communicate with various client terminals or user systems such as a user system or an administrator system, or other layers of system 100 such as a database layer, business application layer, etc. For example, communication module 225 provides to communication interface 205 information that is to be communicated. As another example, communication interface 205 provides to communication module 225 information received by system 200. Communication module 225 is configured to receive one or more queries or requests to execute tasks such as from various client terminals or user systems (e.g., from the terminals or systems via a business application layer). The one or more queries or requests to execute tasks is with respect to information stored in one or more datasets. Communication module 225 is configured to provide to various client terminals or user systems information such as information that is responsive to one or more queries or tasks requested to be executed. In some embodiments, communication module 225 provides the information to the various client terminals or user systems information in the form of one or more reports (e.g., according to a predefined format or to a requested format), and/or via one or more users interfaces (e.g., an interface that user system is caused to display).

In some embodiments, communication module 225 is configured to receive information and/or an instruction pertaining to a performance characteristic or dimension along which information pertaining to a plurality of thread dumps is to be analyzed. For example, a user uses a client terminal to configure a performance analysis (e.g., a set of one or more performance characteristics or profiles to be determined, etc.) on system 200. Examples of configurations with respect to a performance analysis include user-defined vocabulary of states, vocabulary of state transition events, production rules and grammars specifying the state transition model, regular expressions, etc., to parse the stack traces in the plurality of thread dumps, user-defined schema for relation model (dimensions and measures), user-defined directives to transform the state histories to relations, user-defined directives to generates the relations in the output data stream or files, and a configuration of an interval/frequency with which thread dumps are to be taken, an indication of a set of information to be captured in a thread dump, an indication of a set of datasets to be used to build a relational model, an indication of a dimension(s) over which system 200 is to analyze performance information with respect to a service, application, or set of code, a configuration of a dashboard, etc. In some embodiments, communication module 225 is configured to communicate results of the performance profiling. For example, communication module 225 sends the results to a user such as via a user interface of a client terminal. Examples of the results of the performance profiling include a report of one or more performance characteristics, a benchmarking across a set of contexts, an analysis of the one or more performance characteristics, a comparison of an expected performance profile with a measured performance profile, a statistical outlier (e.g., an anomaly) relative to past tests or relative to results from different contexts (e.g., an anomaly relative to an expected performance profile), an identification of a configuration or component causing a degradation or bottleneck in providing the service and/or executing an application or a set of code, etc.

In some embodiments, system 200 comprises thread dumping module 230. System 200 uses thread dumping module 230 to obtain a plurality of thread dumps (e.g., information pertaining to a plurality of thread dumps). The plurality of thread dumps are taken during performance of a service and/or execution of an application or set of code. In some embodiments, thread dumping module 230 configures the service, application, or set of code to perform a thread dump. In some embodiments, thread dumping module 230 obtains the plurality of thread dumps from data store or a system(s) providing the service and/or executing the application or set of code. Thread dumping module 230 can configure a frequency or interval at which the thread dumps are to be taken with respect to a particular service, application, and/or set of code.

In some embodiments, system 200 comprises relational model module 235. System 200 uses relational model module 235 to determine a relational model based at least in part on the plurality of thread dumps (e.g., the information pertaining to a plurality of thread dumps). In some embodiments, relational model module 235 transforms the information pertaining to the plurality of thread dumps to the relational model. The transformation of the plurality of thread dumps to the relational model includes relational model module 235 determining a state transition model (e.g., a state transition model during execution of a set of code, such as a state transition of a set of code in a thread executed by a virtual machine). In some embodiments, relational model module 235 uses the states and events of the state transition model to transform the thread dumps to the relational model. Relational model module 235 may determine the relational model based at least in part on one or more configurations or settings such as user-defined vocabulary of states, vocabulary of state transition events, production rules and grammars specifying the state transition model, regular expressions, etc., to parse the stack traces in the plurality of thread dumps, user-defined schema for relation model (dimensions and measures), user-defined directives to transform the state histories to relations, user-defined directives to generates the relations in the output data stream or files, and configurations with respect to sets of information to be used to generate the relational model, dimension(s) to include in the relational model, etc.

In some embodiments, relational model module 235 determines thread intensities with respect to one or more dimensions or parameters of the service/application/set of code executed (and being profiled). For example, relational model module 235 determines thread intensities with respect to a state of the processing service/application/set of code such as based on an indication of a task (or subtask, operation, etc.) that is at a top of the stack when the corresponding thread dump is taken. According to various embodiments, relational model module 235 obtains information pertaining to a plurality of thread dumps, determines a thread intensity of one or more states (or sequence of states) based at least in part on the information pertaining to a plurality of thread dumps, and determines one or more performance characteristics with respect to performing a set of code based at least in part on determining a thread intensity of one or more states.

In some embodiments, system 200 comprises performance analysis module 240. System 200 uses performance analysis module 240 to analyze the information obtained from the plurality of thread dumps, the relational model, etc. Performance analysis module 240 determines a performance profile (e.g., one or more performance characteristics) associated with a service, an application, a set of code, etc. For example, performance analysis module 240 determines the performance profile based on the relational model. Performance analysis module 240 can filter information comprised in the relational model. For example, performance analysis module 240 filters the information along one or more dimensions.

In some embodiments, performance analysis module 240 determines relative latency information of operations or subtasks. For example, performance analysis module 240 determines a percentage of time to process a task that is devoted (e.g., spent) to processing a particular subtask or operation. In some embodiments, performance analysis module 240 determines a percentage of time to process a task for each of the various subtasks or operations comprised in the task. As an example, performance analysis module 240 divides a thread intensity with respect to an operation (e.g., a number of occurrences the operation was identified as being in the top of the stack among the plurality of thread dumps) by a number of thread dumps sampled. In the case that a set of 200 thread dumps are analyzed and 50 of those 200 thread dumps indicate that the top of the stack are associated with a particular operation, then that particular operation may be deemed to correspond to 25% of the overall latency of the task measured by the plurality of thread dumps (e.g., providing a service, executing an application, executing a set of code, etc.). In response to determining the relative latency information, performance analysis module 240 may identify subtasks or operations that are likely to cause a latency or for which an improvement may be most impactful with respect to the overall processing of the task. In some embodiments, performance analysis module 240 determines (e.g., identifies) a subset of subtasks/operations that have a relatively large relative latency information. As an example, performance analysis module 240 determines a subset of subtasks or operations having a relative latency (or relative processing time) greater than 25% of the overall time for processing the corresponding task. As an example, performance analysis module 240 determines a subset of subtasks or operations having a relative latency (or relative processing time) greater than 40% of the overall time for processing the corresponding task. As an example, performance analysis module 240 determines a subset of subtasks or operations having a relative latency (or relative processing time) greater than 50% of the overall time for processing the corresponding task. Various other thresholds with respect to relative latency can be implemented. For example, the threshold with respect to subtasks/operations having a relative latency exceeding such threshold may be configurable, such as by a developer, an administrator, etc.

In some embodiments, performance analysis module 240 uses the relational model and/or latency information in connection with determining (e.g., detecting) anomalies or performance regressions. For example, performance analysis module 240 determines (or obtains) expected performance profiles with respect to services, applications, or a set of code (or a task, subtask, and/or operation of the service, application, or set of code). The expected performance profile comprises one or more performance characteristics pertaining to historical performance of the corresponding services, applications, or a set of code (or a task, subtask, and/or operation of the service, application, or set of code). In response to the relational model and/or latency information being determined with respect to a plurality of thread dumps (e.g., associated with a service, application, or set of code), performance analysis module 240 compares one or more performance characteristics of the relational model or latency information with the expected performance profile. Performance analysis module 240 performs a statistical analysis (e.g., a statistical regression, etc.) to determine any statistical outliers (e.g., anomalies, performance regression, etc.). Accordingly, performance analysis module 240 may isolate parts (e.g., components, operations, etc.) of the service, application, or set of code that has experienced performance regression or that is creating a bottleneck or resource constraint.

In some embodiments, system 200 comprises pattern detection module 245. System 200 uses pattern detection module 245 to detect a framework or component to which a particular subtask or operation belongs based at least in part on a detected pattern or sequence of calls among the plurality of threads. According to various embodiments, a particular framework corresponds to a particular pattern of states, calls, or processes. For example, a particular framework has a corresponding pattern of a sequence of states. In some embodiments, system stores 200 a mapping of particular pattern of states, calls, or processes to frameworks or sets of code (or subsets of code). For example, storage 215 stores a mapping of a sequence of states to frameworks. As another example, storage 215 stores a mapping of a sequence of states to sets of code. Pattern detection module 245 the mapping of the sequence of states to frameworks to determine performance (e.g., one or more performance characteristics) pertaining to a part of code or a framework.

System 200 (e.g., relational model module 235 and/or performance analysis module 240) can determine a state trace for execution of a thread based at least in part on the information pertaining to the plurality of thread dumps. The thread dumps correspond to a time series data and thus a set of sequential thread dumps can be used to determine state transitions during performance of the service or execution an application/set of code. For example, the state history determined from the set of sequential thread dumps shows how different threads move through the code during execution. In some embodiments, pattern detection module 245 determines one or more patterns of the one or more states (e.g., one or more sequences of states) based at least in part on the state trace or the information pertaining to a plurality of thread dumps or the intensity of one or more states (or sequence of states). Pattern detection module 245 determines a subset of code or framework respectively corresponding to the one or more patterns of the one or more states. For example, pattern detection module 245 performs a lookup against a mapping of patterns to frameworks or sets of code (e.g., a mapping of a sequence of states to frameworks, etc.) in connection with determining subset of code or framework respectively corresponding to the one or more patterns of the one or more states. In some embodiments, pattern detection module 245 determines a degree of similarity between a sequence of states or state trace information and a defined pattern comprised in frameworks or sets of code to determine a particular set/subset of code being executed at the time of the thread dump or a component/framework being invoked at the time of the thread dump, etc.

In some embodiments, system 200 comprises an optimization module 250. System 200 uses optimization module 250 to determine subsets of code that are causing a relatively large amount of latency, a bottleneck of the code, a resource constraint, etc.

In some embodiments, optimization module 250 identifies parts of the code (e.g., a subtask, an operation, etc.) for which a relative latency exceeds a threshold latency value. The optimization module 250 deems such parts of the code to be parts for which an improvement thereto is most impactful in reducing overall latency of the task or of the entire set of code. As an example, optimization module 250 identifies a subset of subtasks or operations having a relative latency (or relative processing time) greater than 25% of the overall time for processing the corresponding task. As an example, optimization module 250 identifies a subset of subtasks or operations having a relative latency (or relative processing time) greater than 40% of the overall time for processing the corresponding task. As an example, optimization module 250 identifies a subset of subtasks or operations having a relative latency (or relative processing time) greater than 50% of the overall time for processing the corresponding task. Various other thresholds with respect to relative latency can be implemented. Optimization module 250 can provide the identified parts of the code to a developer.

In some embodiments, optimization module 250 determines whether the system running the set of code experiences a resource constraint based at least in part on the information obtained from a set of thread dumps. In some embodiments, aggregating or analyzing the memory or resource usage measurement information obtained from the plurality of thread dumps and filtering or drilling-down along various dimensions can indicate a maximum memory or resource usage of various set of code in a group of tasks. In response to determining a resource constraint, optimization module 250 causes resources to be reserved based on the analysis of the maximum memory or resource usage of performance of a thread (e.g., if memory is a constraint during execution of code, optimization module 250 can identify the constraint based on memory usage information obtained from the thread dumps). Optimization module 250 subsequently causes appropriate resources to be reserved for performance of the thread such as increasing memory reserved for the thread. In various embodiments, reservation of resources includes allocating memory resources in addition to current resources to a current thread, suspending the execution of other tasks and stopping the admission of new tasks (e.g., stopping the threads, determining a current resource, determining an additional needed resource, adding the additional needed resource to the current resource, resuming the thread, etc.), or any other appropriate manner of allocation of resources.

In some embodiments, system 200 comprises recommendation module 255. System 200 uses recommendation module 255 to determine recommendations for improving performance of the service or execution of an application or set of code. For example, recommendation module 255 determines subsets of the code causing a disproportionate or relatively large amount of latency during execution of a set of code. Recommendation module 255 provides information for a dashboard to identify the relative latencies for parts of the code (e.g., subtasks, operations, etc.). As an example, recommendation module 255 can cause displays parts of the code having a large amount of latency to be displayed emphatically.

In some embodiments, system 200 comprises user interface module 260. System 200 uses user interface module 260 to provide output to a user. For example, user interface module 260 configures and provides a dashboard to a user interface. In some embodiments, the dashboard includes latency information pertaining to execution of a set of code. The latency information may comprise relative latency information. In some, the dashboard includes state trace information indicating a sequence of states of a thread as the thread moves through executing the set of code.

According to various embodiments, storage 215 comprises one or more of filesystem data 265, thread data 270, and/or performance data 275. Storage 215 comprises a shared storage (e.g., a network storage system) and/or database data, and/or user activity data. In some embodiments, filesystem data 265 comprises a database such as one or more datasets (e.g., one or more datasets for one or more tenants, etc.). Filesystem data 265 comprises data such as a dataset against which a set of code is to be executed, historical information pertaining thread dumps, expected performance profiles, a human resources database, a financial database, etc.). In some embodiments, thread data 270 comprises information pertaining to one or more thread dumps taken during execution of a set of code (or performance of a service or execution of an application). For example, thread data 270 comprises information pertaining to a state of a machine or system when a thread dump is taken during execution of the set of code (e.g., a memory usage, a last stack frame, a top of the stack, etc.). In some embodiments, performance data 275 comprises information pertaining to a result or analysis of one or more thread dumps such as a performance profile for executing the set of code over one or more contexts. As an example, performance data 275 comprises one or more performance characteristics, a report, a benchmarking of tests across contexts, versions of code, a comparison of one or more performance characteristics to historical information such as an expected performance profile, etc.

According to various embodiments, memory 220 comprises executing application data 280. In some embodiments, application data 280 comprises a set of code to be executed. In some embodiments, application data 280 comprises data obtained or used in connection with executing an application such as an application executing on a tenant. In embodiments, the application comprises one or more applications that perform one or more of receive and/or execute a test, a query or task, etc., generate a report and/or configure information that is responsive to an executed query or task, and/or to provide to a user information that is responsive to a query or task, perform a performance profiling of execution of an application or a set of code, transform information from thread dumps to latency information such as relative latencies of components/parts of the code, determine a relational model based on information obtained from a plurality of thread dumps, etc. Other applications comprise any other appropriate applications (e.g., an index maintenance application, a communications application, a chat application, a web browser application, a document preparation application, a report preparation application, a user interface application, a data analysis application, an anomaly detection application, a user authentication application, etc.).

Figure 3:
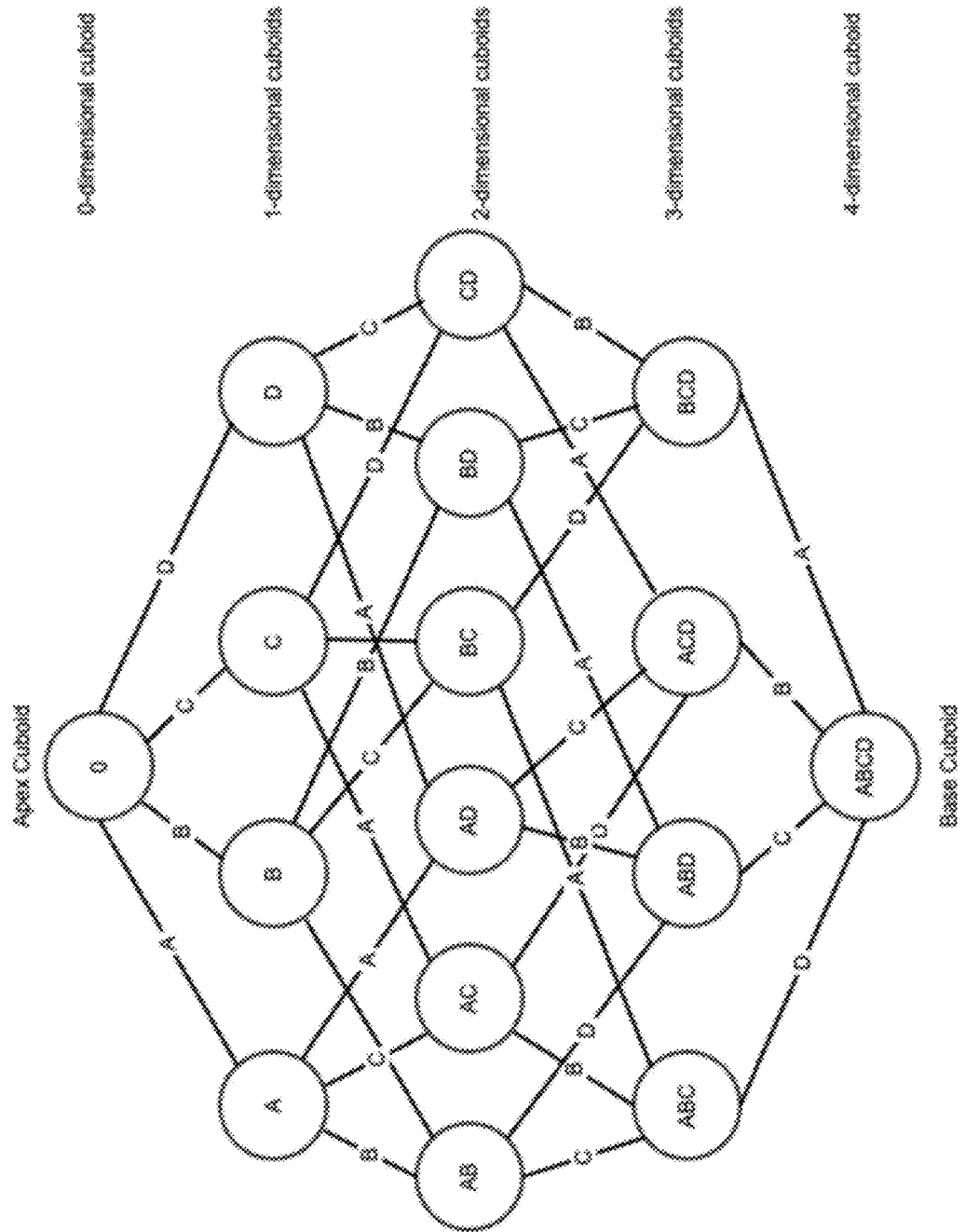
FIG. 3 is a diagram of a cuboid lattice model determined according to a plurality of thread dumps for execution of a set of code according to various embodiments of the present application.

FIG. 3 is a diagram of a cuboid lattice model determined according to a plurality of thread dumps for execution of a set of code according to various embodiments of the present application.

According to various embodiments, the system determines a relational model using a plurality of thread dumps dumped (e.g., taken) during execution of a set of code. For example, the relational model is used to construct the cuboid model and the cuboid lattice comprising a plurality of cuboid nodes. As an example, a first node (e.g., node AB) is a 2-dimensional cuboid that provides a pair of feature vectors that the system can compare for regression analysis. In some embodiments, from apex cuboid, drill down to obtain a one-dimensional cuboid (e.g., nodes A or B), and from a one-dimension cuboid, drill-down to obtain a 2-dimensional cuboid in AB dimensions. Each of the two-dimensional cuboids provide a feature vector that the system uses (e.g., compares) for regression analysis. As an example, from the apex cuboid in node 0, the system filters along a first dimension A, and filters again along a second dimension B to obtain a 2-dimensional cuboid in node AB. If the system slices or filters by the members of the first dimension, a 1-dimension cuboids that maps the members of the second dimension to the values of the measures is obtained. The system can take a slice of the cuboid to obtain a feature vector by selecting a member along a dimension to filter the cuboid data. According to various embodiments, the system builds the relational model to enable comparison of values of a drill down dimension between any two slices or among any number of slices as long as the slices are taken along the same dimension.

In some embodiments, the system filters the relational model to obtain mapping of dimension members to the measures (e.g., relative intensity measures pertaining to states, etc.). The dimensions represent the independent variables and the measures represent the dependent variables of the multi-variate functions. The system sorts/orders the dimension members by the magnitude of the measure values. In some embodiments, the system provides a visualization of the dimension members and/or a sorted or ordered set of the dimension members. For example, the system provides a visualization of the relative magnitudes of the measure values (e.g., a qualitative measure of the dimensions). The sorting/ordering of the dimension members and/or visualization of the relative magnitudes of the measure values enables the detection (e.g., determining or identifying, etc.) of anomalies. For example, the system determines a dimension member corresponding an anomalous relative magnitude of the measure value. The system determines a dimension member corresponding an anomalous relative magnitude of the measure value based on one or more statistical thresholds (e.g., thresholds used/set to determine outliers, etc.). In some embodiments, the system emphatically displays a dimension member corresponding to an anomalous relative magnitude of the measure value such as by displaying information pertaining to such dimension member as being brighter, bolder, or in a different color, etc. This is a visual effect of the qualitative changes in the relative magnitudes of the members. In some embodiments, the dimension member corresponding an anomalous relative magnitude of the measure value can indicate a regression in one component (e.g., part of the code for which the thread dumps are obtained) that may need to be diagnosed. As the set of code is deployed in different environments or in different generations of hardware platforms whose performance may vary by 10 to 20 percent, the information obtained from the plurality of thread dumps taken during execution of the set of code may indicate different performance (e.g., across one or more performance characteristics determined based on the information pertaining to the plurality of thread dumps). Accordingly, even if a thread intensity measure varies by 10 to 20 percent from build to build (e.g., a deployment deployed in the same environment at different times, a deployment deployed in different environments, etc.), the relative magnitude of the latency measures should not change qualitatively. The system (or the user based on a visualization provided by the system) can determine an anomaly based on a qualitative change of the relative magnitude that the latency measures.

Various regression models are implemented in connection with analyzing one or more performance characteristics using the information from the plurality of thread dumps. In some embodiments, the system applies mathematical models with respect to information obtained from a plurality of thread dumps. An example of the mathematical model is the kernel regression model. A Kernel Regression model is represented by a set of historical exemplar vectors. A new measured vector is projected into the space spanned by the exemplar vectors to get an estimated vector, which is given by a weighted average of the exemplar vectors. The difference between the estimated vector and the measured vector, called residual, contains the "new" information in the measurement that is not captured already in the historical exemplar vectors. The residuals may contain anomalies that can be detected in the visual comparison charts comparing the estimated vector and the measured vector. In some embodiments, the residuals are normally distributed with mean 0 and a standard deviation and estimate the standard deviation from the distribution of the residuals of the test samples. The residuals for each element of the input vector X are the test statistics for the hypothesis testing strategy.

For example, the system implements a sequential probability ratio test application to analyze residual information to identify anomalies or subsets of code (e.g., components of code) causing performance regression. In some embodiments, the statistical analysis of information obtained from a plurality of thread dumps is performed with respect to development of code (e.g., testing of code being developed). In some embodiments, the system identifies anomalies or parts of code that cause resource constraints or bottlenecks, and can thus identify parts of code that may be improved (e.g., providing an indication or list of code portions that are problematic). In contrast, related art testing systems merely validate performance of code to an expected result. Further, related art testing systems implement instrumentation that adds a relatively large amount overhead to processing of a set of code being analyzed. Taking thread dumps at a relatively low frequency adds very little overhead. Accordingly, various embodiments analyze performance of execution of code in a manner that improves the computer system and contributes very little latency to such execution of the code.

Figure 4A:
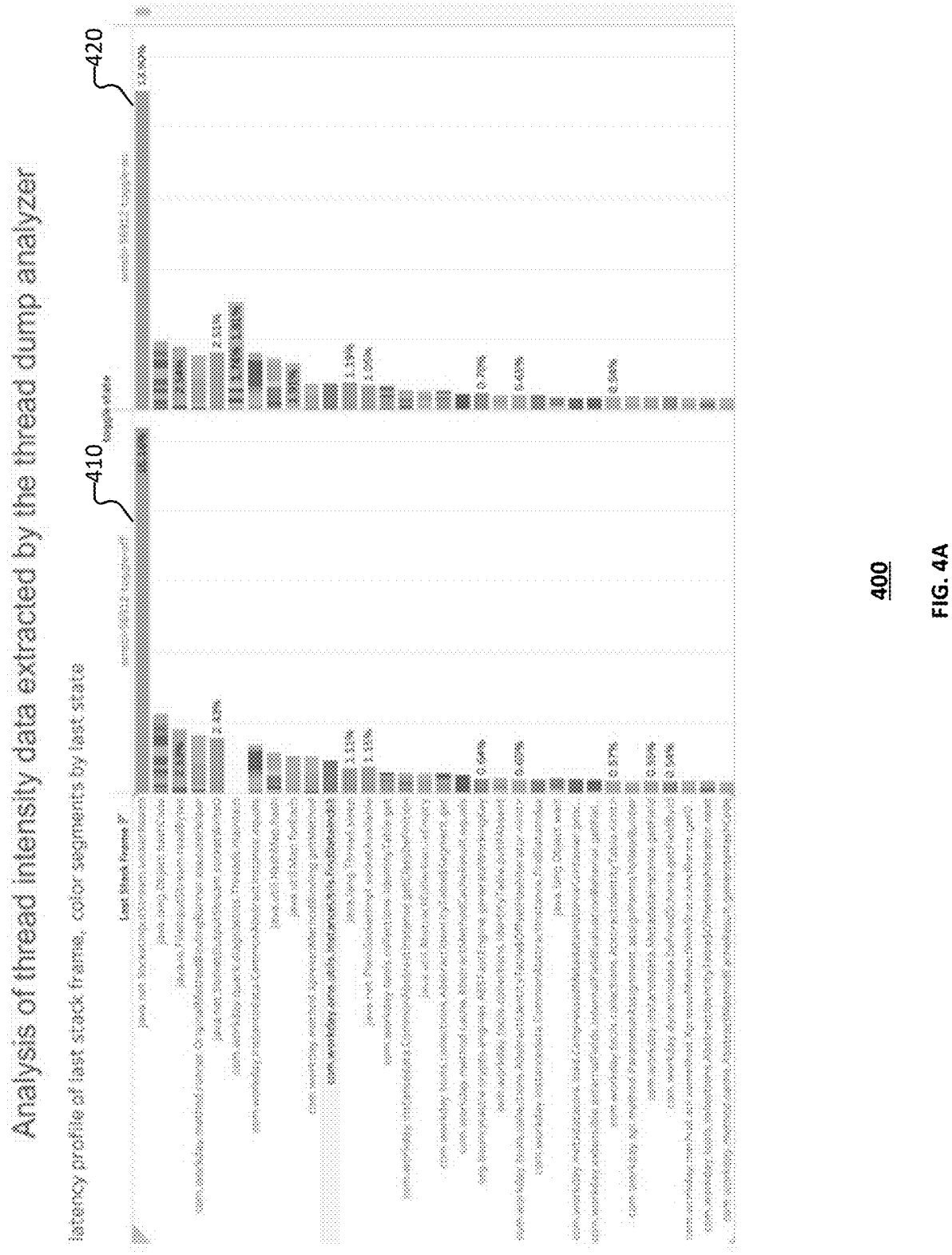
FIG. 4A is a diagram of two feature vectors in the representation of execution of a set of code based on a plurality of thread dumps according to various embodiments of the present application.

FIG. 4A is a diagram of two feature vectors in the relational representation of execution of a set of code based on a plurality of thread dumps according to various embodiments of the present application.

Referring to FIG. 4A, two feature vectors representation 400 is an example of information obtained by slicing and dicing the cuboid model constructed from the relational model and grouping by one or more dimensions. The dimensions along which the feature vectors representation 400 is provided include the last stack frame, last states, and the toggling on/off of a component as indicated by segments 410 and 420 (e.g., omsbi-56912). As illustrated in FIG. 4A, a dimension of relational representation 400 provides color coded segmentation of bars respectively corresponding to a last stack frame. For example, a bar for a last stack frame is segmented according to various last states observed in the thread dumps for such last stack frames. The length of the segment may be positively correlated to a thread intensity associated with the corresponding last state.

According to various embodiments, the feature vectors composed of the thread intensity statistics for the members of the last stack frame dimension are especially suitable for regression analysis because of the relatively high degrees of cross correlation among the elements of the feature vectors. If an anomaly is detected in the intensity of a last stack frame, a drill down along the dimensions such as last state, task type, and task run mode can be performed to identify the source of the anomaly.

Figure 4B:
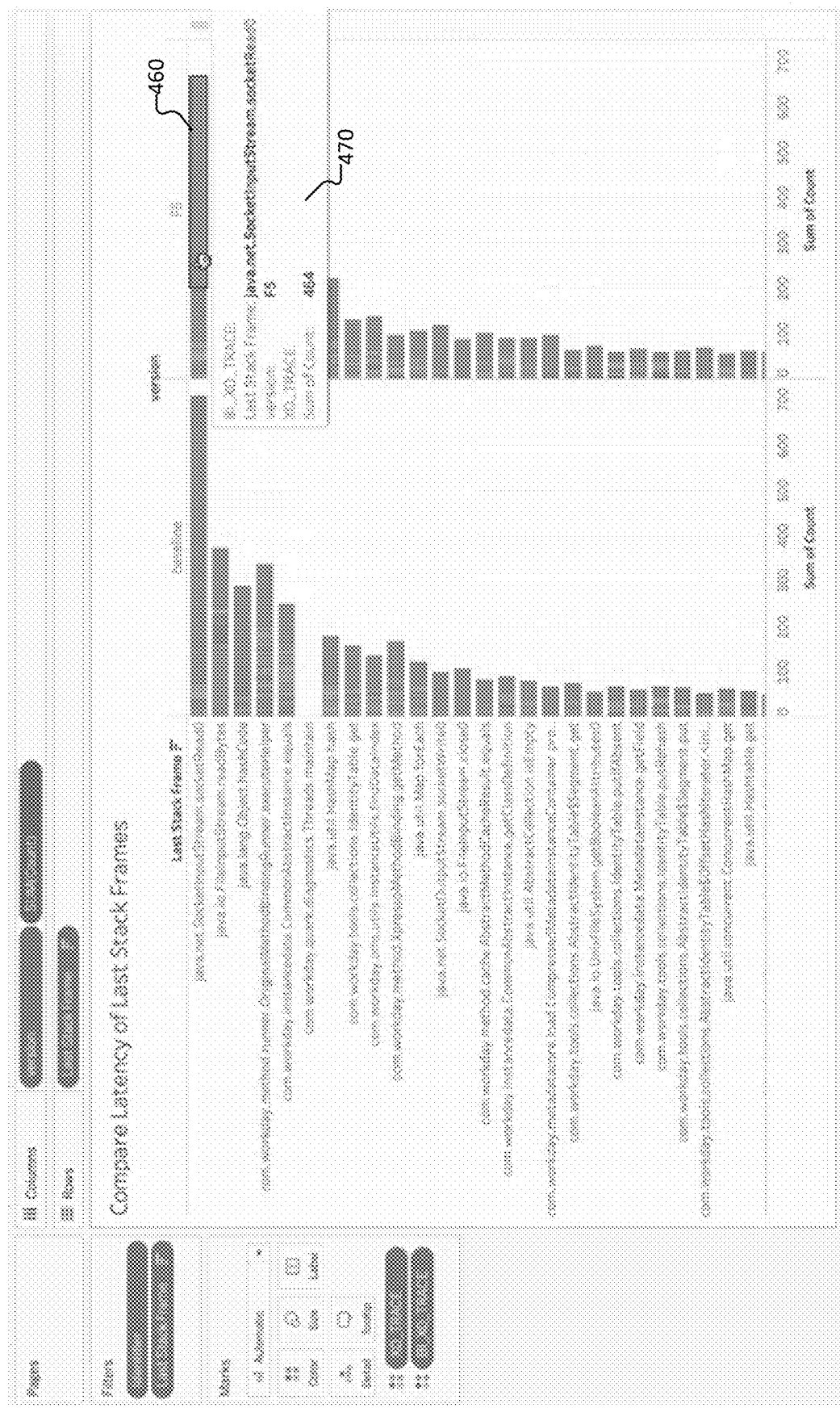
FIG. 4B is a diagram of a feature vector representation of execution of a set of code based on a plurality of thread dumps according to various embodiments of the present application.

FIG. 4B is a diagram of a feature vector representation of execution of a set of code based on a plurality of thread dumps according to various embodiments of the present application.

Referring to FIG. 4B, feature vectors representation 450 illustrates a further drill down along the last stack frame at the top of the feature vectors representation 450 (e.g., last stack frame corresponding to java.net/SocketInputStream.socketRead0). For example, the bar corresponding to such last stack frame is segmented into a plurality of segments, a largest segment corresponding to XO_TRACE. The drill down can be based on a user input such as a hovering over or selection of the corresponding segment. In response to drilling down into segment 460, information pertaining to segment 460 (e.g., the state corresponding to the segment) is provided such as in dialog 470. As illustrated, the latency intensity of the state corresponds to a count of 464 (e.g., 464 occurrences among the set of thread dumps used to create feature vectors representation 450).

Figure 5:
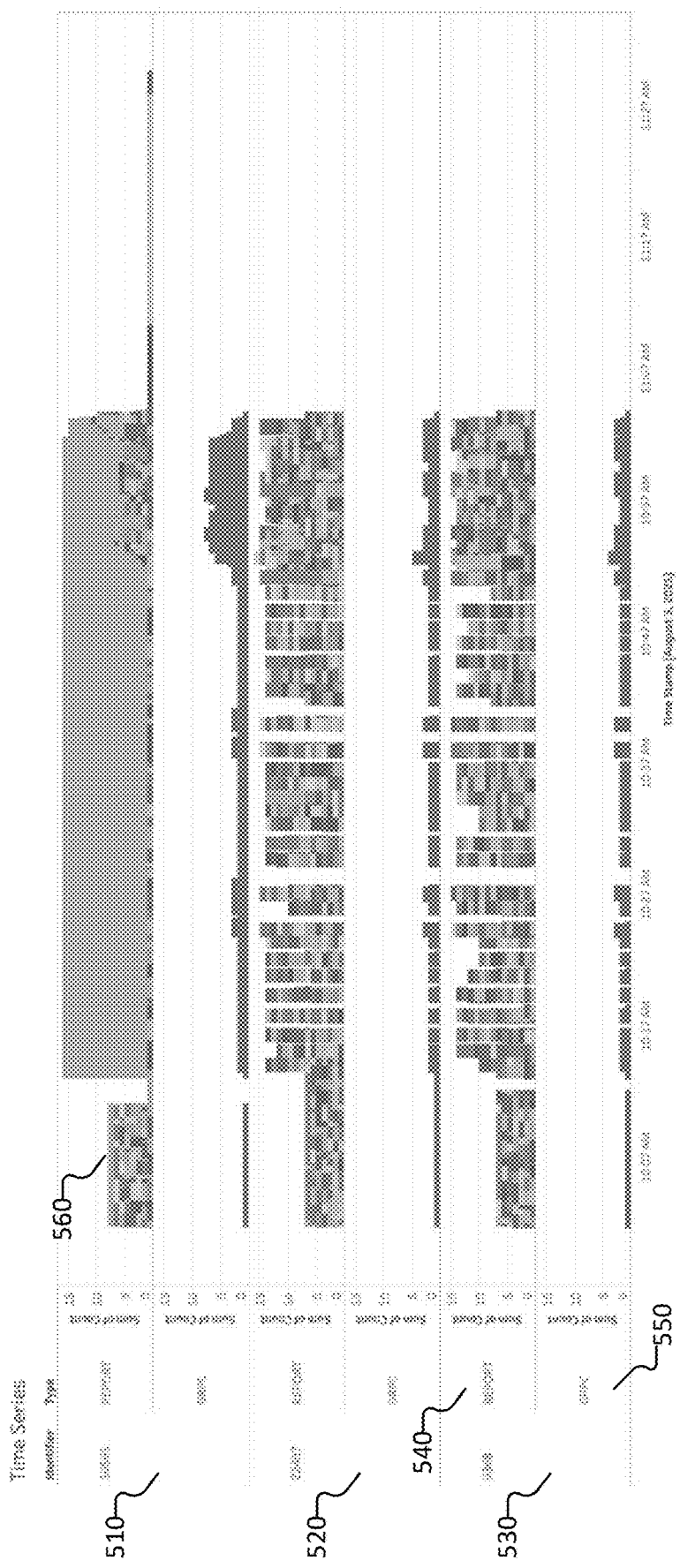
FIG. 5 is a diagram of a time-series representation of execution of a set of code based on a plurality of thread dumps according to various embodiments of the present application.

FIG. 5 is a diagram of a time-series representation of execution of a set of code based on a plurality of thread dumps according to various embodiments of the present application.

Referring to FIG. 5, time-series representation 500 is an example of information obtained from a relational model and rendered according to one or more dimensions. The dimensions along which the time-series representation 500 is provided include a virtual machine dimension and a thread pool dimension along the vertical axis, and a time dimension along the horizontal axis, and a state dimension or a state history dimension as markers to segment the bars by colors. As illustrated in FIG. 5, a set of representations corresponding to a first virtual machine 510, a second virtual machine 520, and a third virtual machine 530 is provided in time-series representation 500. The representation for each of the first virtual machine 510, the second virtual machine 520, and the third virtual machine 530 is further segmented according to a type of threads (e.g., report task threads 540 and GRPC threads 550). Further with respect to the different threads or processes, time series data pertaining to a state history for the task/framework/process for a particular virtual machine is provided. The set of thread dumps used to generate time-series representation 500 are sampled every 10 seconds based on the time scale at the bottom of time-series representation 500. With respect to each sampled time a thread intensity is shown for the particular states. For example, as denoted at bar 560, the thread intensity is further segmented such as according to states of state history. The size of a segment in the segmentation of a bar in the time-series representation 500 such as bar 560 is correlated to a thread intensity of a corresponding state.

Figure 6:
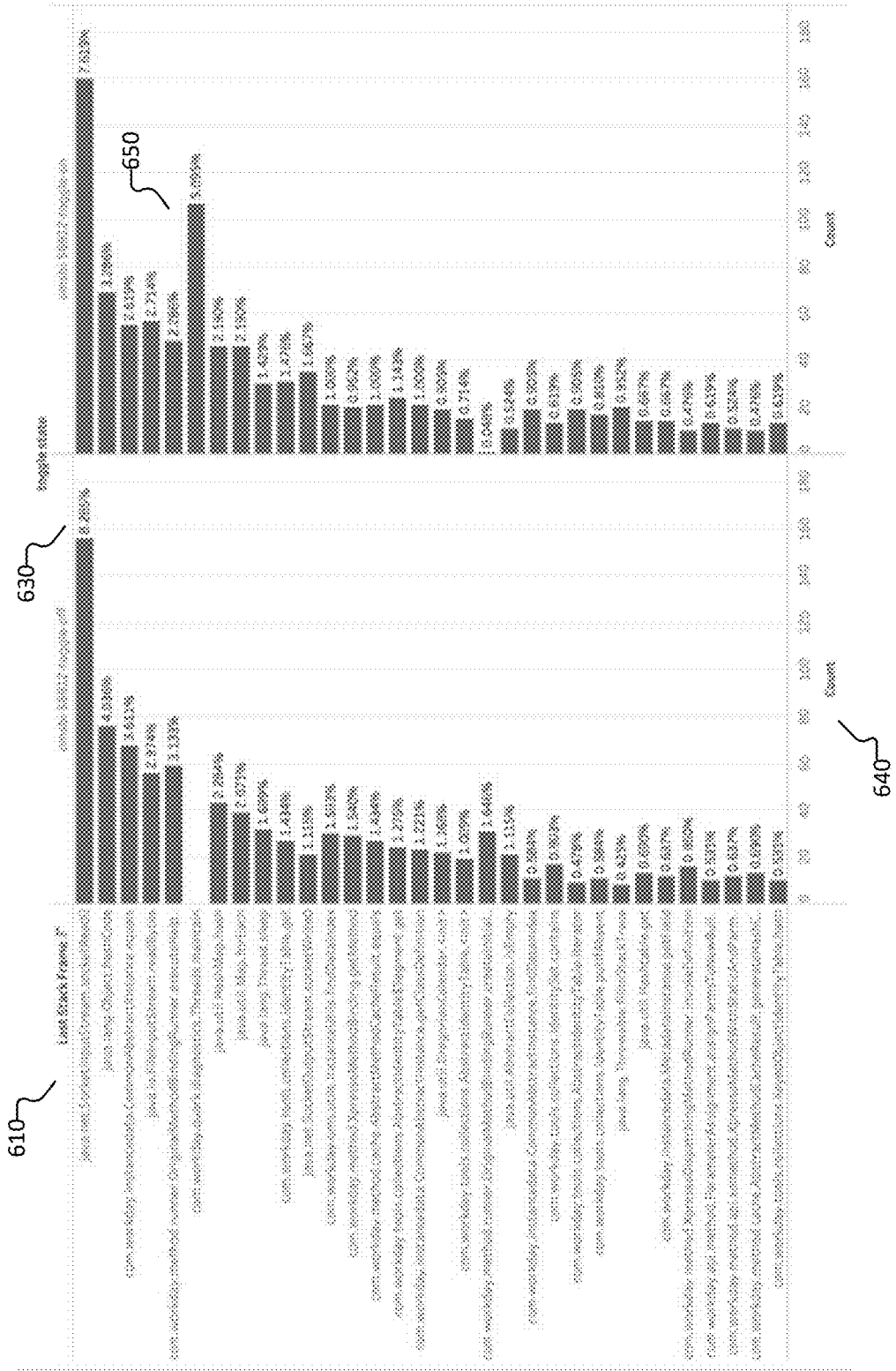
FIG. 6 is a diagram of a relational representation of execution of a set of code based on a plurality of thread dumps according to various embodiments of the present application.

FIG. 6 is a diagram of a relative latency profile representation of execution of a set of code based on a plurality of thread dumps according to various embodiments of the present application.

Referring to FIG. 6, relative latency profile representation 600 is an example of information obtained from a relational model and rendered according to one or more dimensions. The dimensions along which the relative latency profile representation 600 is provided include last stack frame 610, relative latency 630, thread counts 640, and a toggling on/off of a process. As illustrated in FIG. 6, a set of representations corresponding the last stack frames are presented as bars, the length of which is correlated to a thread intensity for the corresponding last stack frame. The thread intensity can be used as a proxy for latency information at least because the thread dumps correspond to time series data and/or the thread dumps represent states of a service or execution of a set of code when the machine performing such service or executing such code is sampled. Creating the relational model from the plurality of thread dumps and aggregating the composite information along one or more dimensions enables identification of parts of the code that contribute a relative large amount of latency. For example, the relative latency (in percentage of total) of last stack frame denoted by 630 is illustrated to have a relative large amount of latency as compared to relative latencies of other frames in the last stack frame dimension. As another example, analyzing the relational model across the dimension of toggling on/off of the process, the frame denoted by 650 has a relatively large latency when the relational model includes the process, and has no contributed latency when the process is toggled off (e.g., as seen in the difference between the left bar graphs and the right bar graphs in FIG. 6). Thus, the process forming the dimension from which the relational model is analyzed can indicate that the frame denoted by 650 contributes a significant latency to such process (e.g., because all thread counts for such frame are only observed when information for that process is included in the relational model). Such frame denoted by 650 may be a target for improvement (e.g., optimization to reduce the overall latency, etc.). In some embodiments, the system indicates or lists this significant difference in associated inferred latency. In various embodiments, the indication(s) and/or the list(s) are used for stopping, bug indications, repair indications, or any other appropriate system diagnostic information.

Figure 7:
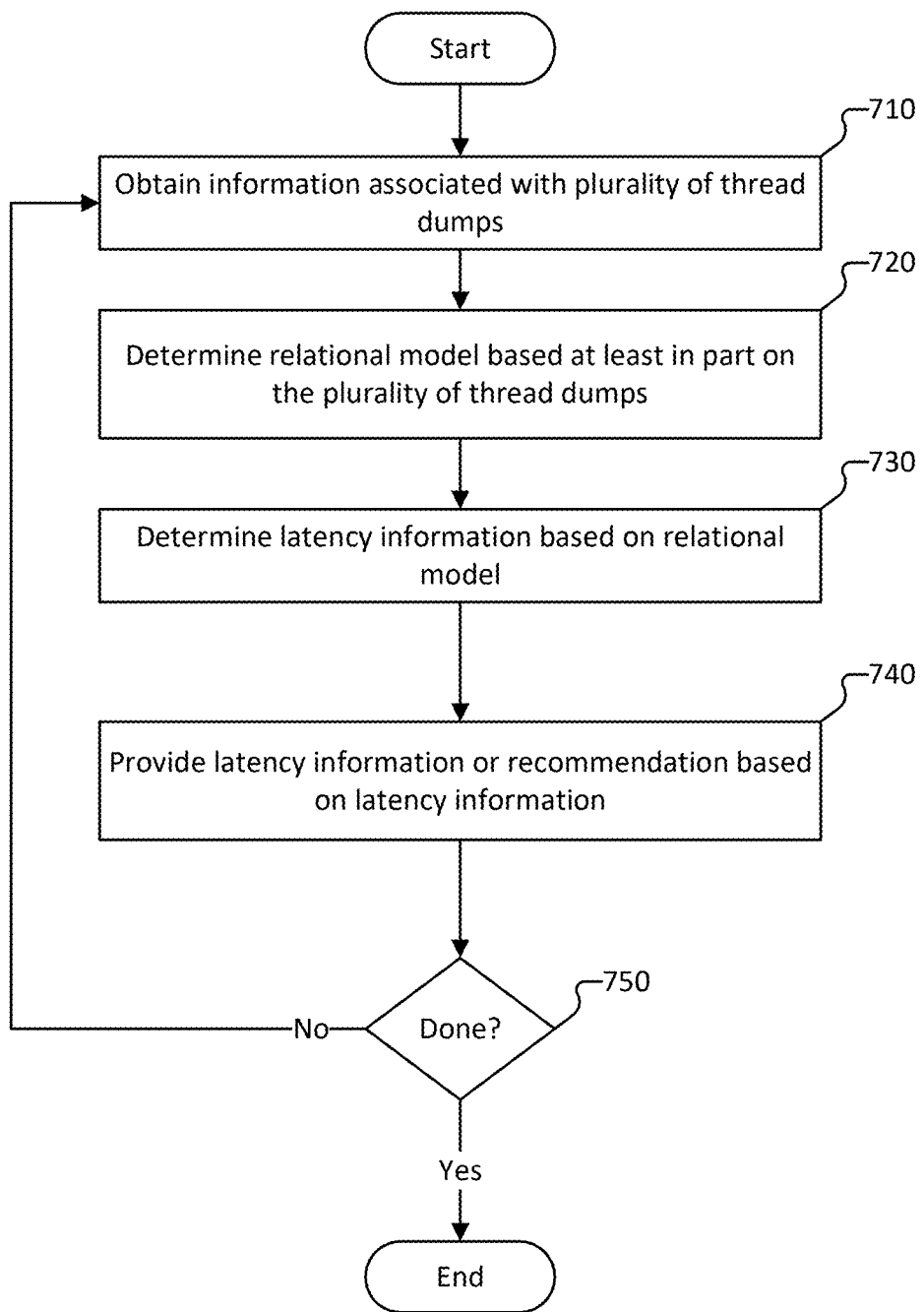
FIG. 7 is a flow diagram of a method for determining latency information using thread dumps from execution of a set of code according to various embodiments of the present application.

FIG. 7 is a flow diagram of a method for determining latency information using thread dumps from execution of a set of code according to various embodiments of the present application.

At 710, information associated with a plurality of thread dumps is obtained. In some embodiments, the system obtains (e.g., retrieves) the information associated with a plurality of thread dumps from a data store. In some embodiments, the system receives the plurality of thread dumps contemporaneous with the thread dumps being captured (e.g., the system retrieves/receives the thread dumps from the machine as the machine is dumping the thread dump while executing code). In some embodiments, the system causes a thread dump to be captured during execution of a set of code, etc.

According to various embodiments, the information associated with the plurality of thread dumps is obtained in connection with a performance profile. For example, in response to receiving a user request to perform a performance profiling and/or in response to receiving selection of a set of thread dumps for which information is to be obtained, the system obtains the information associated with the plurality of thread dumps.

At 720, a relational model is determined based at least in part on the plurality of thread dumps. In some embodiments, the system determines the relational model using at least the information associated with the plurality of thread dumps. For example, the set of the plurality of thread dumps can be used as a proxy for latency information for execution of the set of code.

According to various embodiments, the relational model includes information pertaining to performance of executing a set of code. The system obtains the relational model based at least in part on aggregating a measure of the sequence of states or calls and a plurality of datasets which respectively measure performance across at least one different dimension. Examples of a measure of the sequence of states or calls and a plurality of datasets associated with the tasks include a transaction management task statistics dataset, a concurrent operations dataset, a resource allocation statistics dataset, a garbage collector statistics dataset, a query engine statistics dataset. In some embodiments, the plurality of datasets includes information pertaining to a dimension for a performance characteristic of a task. In some embodiments, the system joins the plurality of datasets along a dimension corresponding to a request identifier (e.g., an identifier corresponding to a task). Various other dimensions can be implemented to join the plurality of datasets. Examples of a dimension over which the plurality of datasets can be aggregated include: a customer identifier, a tenant identifier, a product identifier, a task definition identifier, a report definition identifier, a business object identifier, a data source identifier, a host computer server, a virtual machine server, a cluster of servers, an environment, a data center, a tenant's production, implementation, sandbox configuration, etc.

At 730, latency information is determined based at least in part on the relational model. In some embodiments, the system uses the plurality of thread dumps (or information associated with the plurality of thread dumps) as a proxy for latency information.

In some embodiments, the system determines a thread intensity of one or more states (or sequence of states) based at least in part on the relational model, and determines one or more performance characteristics with respect to performing a set of code based at least in part on determines a thread intensity of one or more states. The one or more performance characteristics comprise the latency information.

According to various embodiments, the system determines the latency information based at least in part on the thread intensity corresponding to the plurality of thread dumps. For example, the system determines a relative latency of one or parts/subsets of the set of code (e.g., a framework, a component, etc.). The relative latency is determined based on a thread count for a part of code as compared to a total thread count of the plurality of threads being analyzed.

In some embodiments, the system determines the latency information (e.g., the relative latency) along a dimension corresponding to an element (state or call) at the top of the stack. The stack can be deemed to represent a method chain (e.g., for a thread). For example, the stack may be deemed to be representative of operations (e.g., all operations) invoked during execution of a thread. The top of the stack can be deemed to be a method call or an operation associated with a thread that is running. For example, a state or call may be the last element pushed to the top of the stack. The last element pushed to the top of the stack can be used to determine (e.g., infer) a state of the thread with respect to execution of a set of code. The system determines the offered load or latency as a percentage (e.g., a qualitative representation) because of the use of the set of thread dumps as effective snapshots of the state of the execution of the set of code (e.g., a state or call at the top of the stack at the time that the thread dump is take), etc. During the lifecycle of a task, an operation takes up a certain percentage of time (e.g., a percentage of a time to perform the entire task such as the task for which latency is being measured).

At 740, the latency information or a recommendation determined based at least in part on the latency information is provided. In some embodiments, the system provides the latency information or a recommendation for improving performance of the set of code for which the plurality of thread dumps are analyzed. As an example, the system provides the latency information to a client system such as via a user interface. As an example, the system configures the user interface to include a relational representation comprising the latency information. In some embodiments, the system provides the latency information as illustrated in FIGS. 4A, 4B, 5, and 6.

At 750, a determination is made as to whether process 700 is complete. In some embodiments, process 700 is determined to be complete in response to a determination that the performance profiling is complete, no further thread dumps are to be analyzed, the user has exited the system, an administrator indicates that process 700 is to be paused or stopped, etc. In response to a determination that process 700 is complete, process 700 ends. In response to a determination that process 700 is not complete, process 700 returns to 710.

Figure 8:
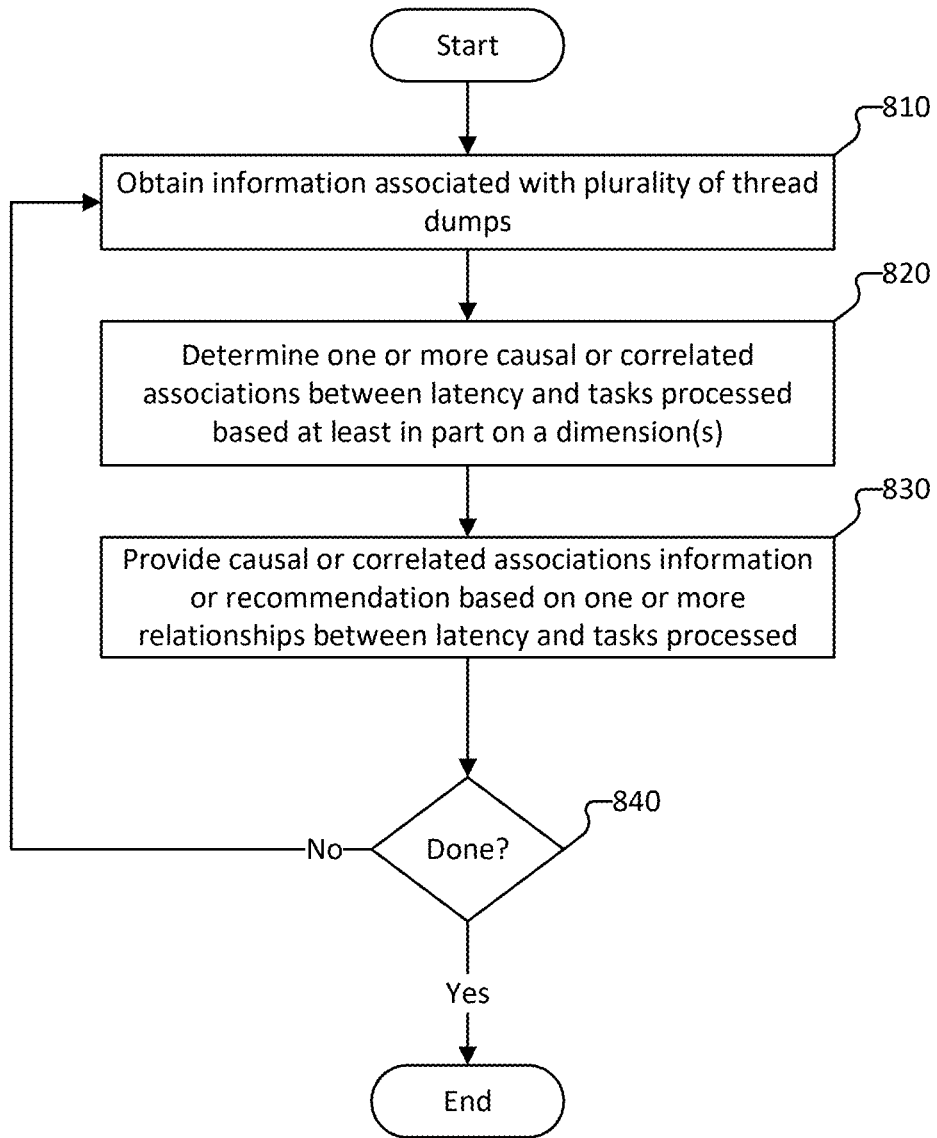
FIG. 8 is a flow diagram of a method for analyzing a plurality of thread dumps from execution of a set of code according to various embodiments.

FIG. 8 is a flow diagram of a method for analyzing a plurality of thread dumps from execution of a set of code according to various embodiments.

At 810, information associated with a plurality of thread dumps is obtained. In some embodiments, 810 correspond to, or is similar to 710 of process 700 of FIG. 7.

At 820, one or more causal or correlated associations between latency and tasks processed are determined based at least in part one or more dimensions of the information associated with a plurality of thread dumps. In some embodiments, 820 correspond to, or is similar to, 720 of process 700 of FIG. 7.

According to various embodiments, the system analyzes the change in latency information over different dimensions. The system analyzes the change in latency information over different dimensions to isolate an area/portion of code for a particular measurement. In some embodiments, the system isolates a portion of code causing a bottleneck or experiencing a performance regression (e.g., relative to an expected processing time, etc.). For example, the system isolates the top stack frame that contributes to performance regression (e.g., based on comparison of latency information of current execution of code with execution of a previous version of the code, such as before a portion of code is introduced, etc.). An illustrative example of analyzing the change in latency information over different dimensions in connection with isolating an area/portion of code is the frame denoted by 650 of relative latency profile representation 600 of FIG. 6. The system analyzes the information pertaining to the plurality of thread dumps along the dimension of toggling the information for the corresponding process on/off. The toggling on/off of the process reveals the contribution of such process to a latency for the frame denoted by 650.

According to various embodiments, the system determines causes for a change in latency, a latency regression, or a performance regression based at least in part on the comparison of the profiles for executing the set of code across different contexts. If a machine/system was able to execute the set of code within an expected period of time (e.g., corresponding to a baseline or expected performance profile), and a subsequent execution of the set of code causes the machine/system to take 150% the expected time, such a performance regression may be caused by a bug being introduced into the set of code (e.g., based on a modification to the code during development/updating). The system identifies an anomaly and provides a notification of the anomaly (e.g., of the performance regression). According to various embodiments, the system determines an anomaly or performance regression based on one or more preset thresholds (e.g., a statistics threshold that can be configured by a user such as an administrator or developer). In some embodiments, in response to detecting an anomaly/performance regression, the system triggers (or prompts a user with a recommendation to trigger) an action, alert, notification, log record, timeout, etc., of execution of the corresponding set of code. Examples of thresholds used to identify an anomaly/performance regression include at least 150% of an expected time, at least 130% of an expected time, at least 120% of an expected time, at least 115% of an expected time. Various other thresholds may be implemented, or otherwise configured by a user.

At 830, causal or correlated associations information or a recommendation based at least in part on the one or more causal or correlation associations between latency and tasks processed are provided.

In some embodiments, the system provides the causal or correlation association information or a recommendation for improving performance of the set of code for which the plurality of thread dumps are analyzed. As an example, the system provides the latency information to a client system such as via a user interface. As an example, the system configures the user interface to include a relational representation comprising the latency information. In some embodiments, the system provides the latency information as illustrated in FIGS. 4A, 4B, 5, and 6.

Examples of recommendations include: setting a threshold to trigger an action, alert, notification, log record, timeout, etc., for a process that has a relatively large latency, restarting a process in different toggle state to select another version of the set of code, identifying a part of code that has a relatively large amount of latency (e.g., a relative latency that exceeds by a predefined latency threshold), identifying a part of code that has experienced performance regression (e.g., a performance regression that exceeds one or more regression threshold) such as based on a update to a set of code, a proposed resource allocation (e.g., based on a resource constraint), etc.

At 840, a determination is made as to whether process 800 is complete. In some embodiments, process 800 is determined to be complete in response to a determination that the performance profiling is complete, no further thread dumps are to be analyzed, the user has exited the system, an administrator indicates that process 800 is to be paused or stopped, etc. In response to a determination that process 800 is complete, process 800 ends. In response to a determination that process 800 is not complete, process 800 returns to 810.

Figure 9:
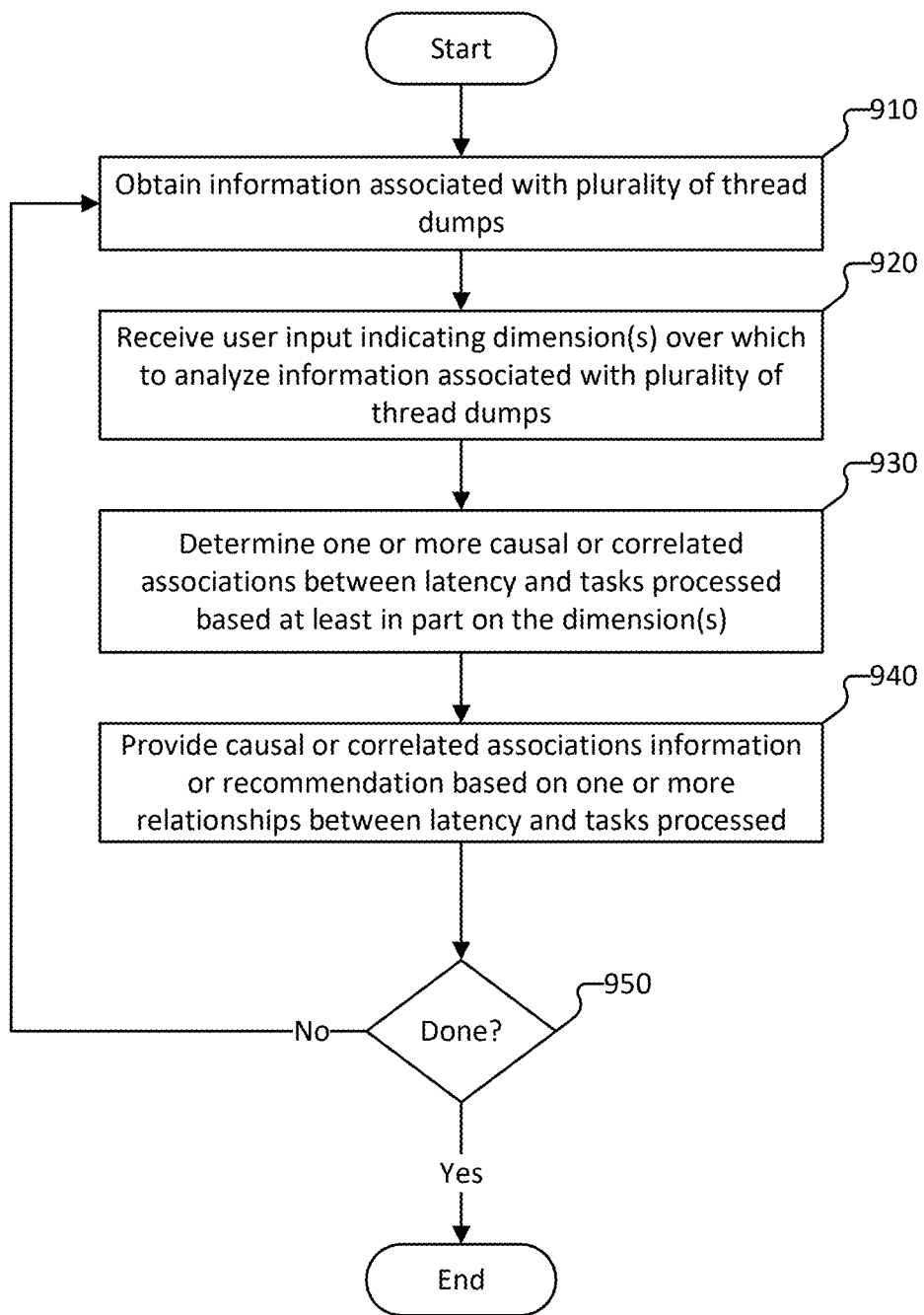
FIG. 9 is a flow diagram of a method for analyzing a plurality of thread dumps from execution of a set of code according to various embodiments.

FIG. 9 is a flow diagram of a method for analyzing a plurality of thread dumps from execution of a set of code according to various embodiments.

At 910, information associated with a plurality of thread dumps is obtained. In some embodiments, 910 correspond to, or is similar to 810 of process 800 of FIG. 8.

At 920, a user input indicating a dimension or multiple dimensions over which to analyze information associated with the plurality of thread dumps is received. In some embodiments, the system receives a user input such as with respect to a relational representation. As an example, the user input corresponds to selection of the dimensions over which to analyze the information associated with the plurality of thread dumps. For example, the user input corresponds to selection of dimensions to generate a time-series representation 500 of FIG. 5. As another example, the dimension(s) include(s) selection of a set of versions of code to compare performance profiles (e.g., to compare latency information). As another example, the dimension(s) include(s) selection of a memory usage of a process or execution of a part of code.

At 930, one or more causal or correlated associations between latency and tasks processed are determined based at least in part one or more dimensions of the information associated with a plurality of thread dumps. In some embodiments, 930 corresponds to, or is similar to, 820 of process 800 of FIG. 8. In some embodiments, the system uses one or more dimensions selected based on the user input to filter the information associated with a plurality of thread dumps in connection with determining the one or more causal or correlated associations between latency and tasks processed.

At 940, causal or correlated associations information or a recommendation based at least in part on the one or more causal or correlated associations between latency and tasks processed are provided. In some embodiments, 940 correspond to, or is similar to, 830 of process 800 of FIG. 8.

At 950, a determination is made as to whether process 900 is complete. In some embodiments, process 900 is determined to be complete in response to a determination that the performance profiling is complete, no further thread dumps are to be analyzed, the user has exited the system, an administrator indicates that process 900 is to be paused or stopped, etc. In response to a determination that process 900 is complete, process 900 ends. In response to a determination that process 900 is not complete, process 900 returns to 910.

Figure 10:
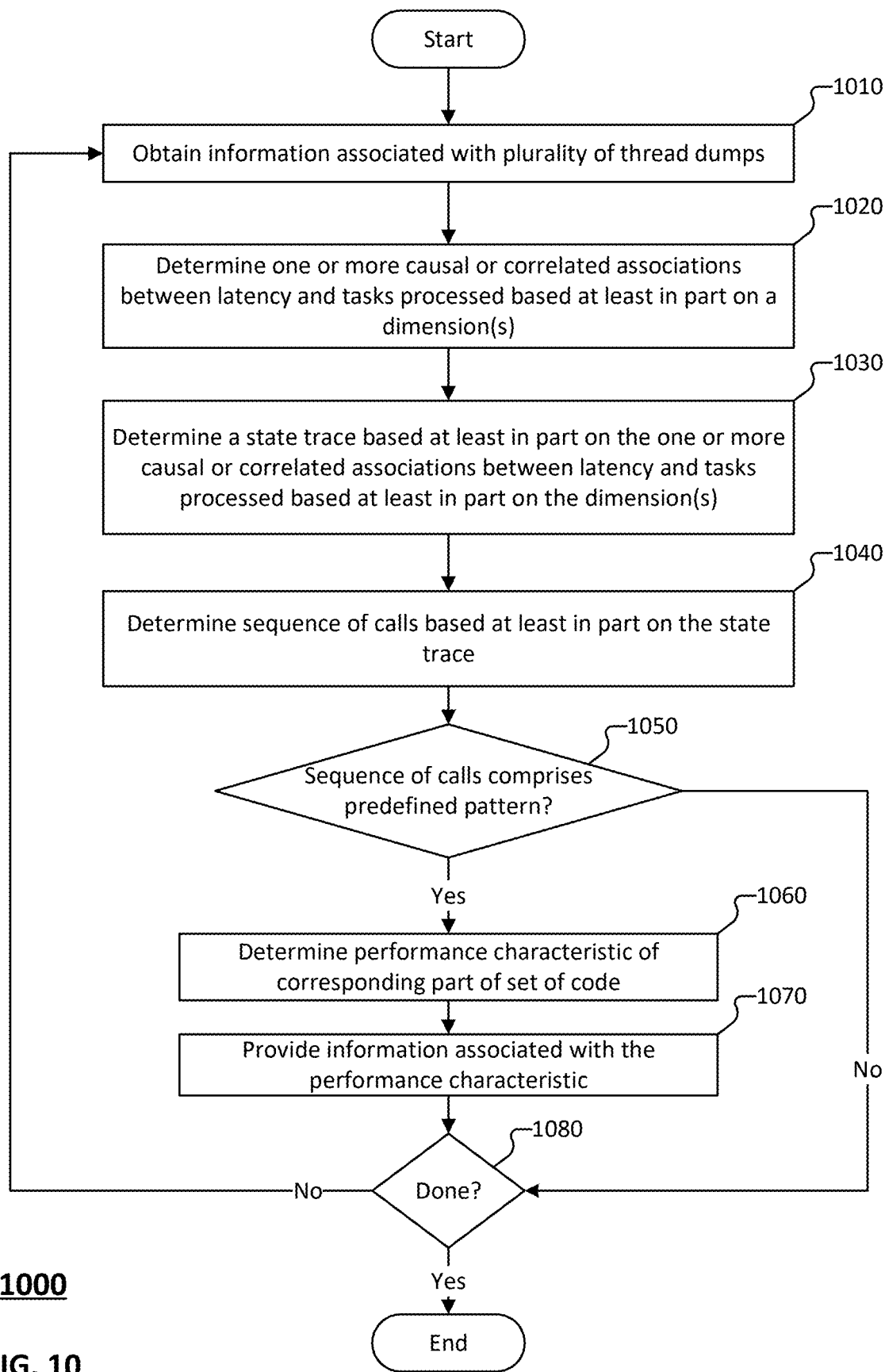
FIG. 10 is a flow diagram of a method for analyzing a plurality of thread dumps from execution of a set of code according to various embodiments.

FIG. 10 is a flow diagram of a method for analyzing a plurality of thread dumps from execution of a set of code according to various embodiments.

At 1010, information associated with a plurality of thread dumps is obtained. In some embodiments, 1010 correspond to, or is similar to, 710 of process 700 of FIG. 7.

At 1020, one or more causal or correlated associations between latency and tasks processed are determined based at least in part on one or more dimensions of the information associated with a plurality of thread dumps. In some embodiments, 1020 corresponds to, or is similar to, 720 of process 700 of FIG. 7, or 820 of process 800 of FIG. 8.

At 1030, a state trace is determined based at least in part on the one or more causal or correlated associations between latency and tasks processed. In some embodiments, the system obtains the one or more causal or correlated associations between latency and tasks, determines a thread intensity of one or more states (or sequence of states) based at least in part on the information pertaining to a plurality of thread dumps. For example, the system determines a subset of code or framework respectively corresponding to a thread intensity of one or more states (or sequence of states). The system determines a state trace for execution of a thread based at least in part on the information pertaining to the plurality of thread dumps. In some embodiments, the state trace is determined based at least in part on one or more dimensions.

At 1040, a sequence of calls is determined based at least in part on the state trace. The system uses the state trace to determine a set of sequences of one or more calls among the various processes, subtasks, etc. performed/called in connection with execution of the code.

In some embodiments, the system determines one or more patterns of the one or more states (e.g., one or more sequences of states) based at least in part on the information pertaining to a plurality of thread dumps or the intensity of one or more states (or sequence of states). For example, the system performs a statistical analysis with respect to the state trace to identify one or more patterns of the one or more states (e.g., one or more sequences of states). In some embodiments, the system determines a sequence of calls based on a repeated set of sequential calls comprised in the state trace.

At 1050, a determination is made as to whether a sequence of calls comprises a predefined pattern. In some embodiments, the system determines whether the sequence of calls matches a predefined pattern. In various embodiments, the predefined pattern corresponds to a routine, a subroutine, a code sequence, a subset of code, or any other appropriate originating source set of instructions of an executing system.

According to various embodiments, a particular framework corresponds to a particular pattern of a set or states, calls, or processes. For example, a particular framework has a corresponding pattern of a sequence of states.

In some embodiments, the system stores a mapping of particular pattern of states, calls, or processes to frameworks or sets of code (or subsets of code). For example, the system stores a mapping of a sequence of states to frameworks. As another example, the system stores a mapping of a sequence of states to sets of code. The system uses the mapping of the sequence of states to frameworks to determine performance (e.g., one or more performance characteristics) pertaining to a part of code or a framework. For example, the system performs a lookup against a mapping of patterns to frameworks or sets of code (e.g., a mapping of a sequence of states to frameworks, etc.) in connection with determining subset of code or framework respectively corresponding to the one or more patterns of the one or more states.

In response to a determination that the sequence of calls does not comprise a predefined pattern at 1050, process 1000 proceeds to 1080. Conversely, in response to a determination that the sequence of calls comprises a predefined pattern at 50, process 1000 proceeds to 1060.

At 1060, a performance characteristic corresponding to a part of the set of code is determined. In some embodiments, the system determines the latency information or other information comprised in the performance profile for the set of code corresponding to the sequence of calls that match the predefined pattern.

According to various embodiments, the system determines the performance characteristic for the set of code corresponding to the predefined pattern by filtering a relational model (or the one or more causal or correlated associations between latency and tasks processed) based at least in part on an identifier of the part of the code (e.g., an identifier of a process, an identifier of a framework, etc.).

At 1070, information associated with the performance characteristic is provided. In some embodiments, the information associated with the performance characteristic comprises an indication of the performance characteristic. As an example, the system provides the information associated with the performance characteristic to a client system such as via a user interface. As an example, the system configures the user interface (e.g., a dashboard on a user interface) to include a relational representation comprising the performance characteristic. In some embodiments, the system provides the latency information as illustrated in FIGS. 4A, 4B, 5, and 6.

At 1080, a determination is made as to whether process 1000 is complete. In some embodiments, process 1000 is determined to be complete in response to a determination that the performance profiling is complete, no further thread dumps are to be analyzed, the user has exited the system, an administrator indicates that process 1000 is to be paused or stopped, etc. In response to a determination that process 1000 is complete, process 1000 ends. In response to a determination that process 1000 is not complete, process 1000 returns to 1010.

Figure 11:
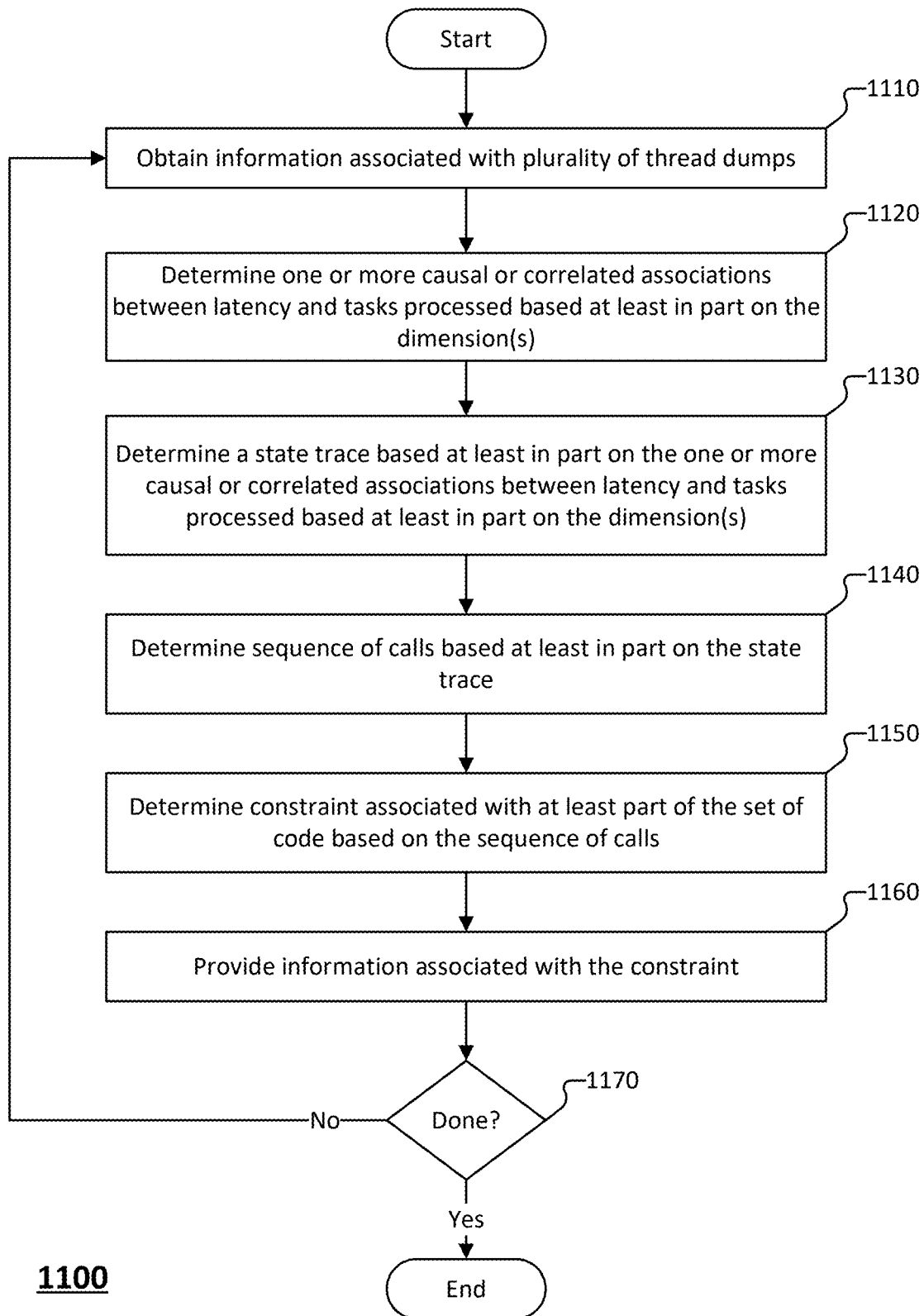
FIG. 11 is a flow diagram of a method for analyzing a plurality of thread dumps from execution of a set of code according to various embodiments.

FIG. 11 is a flow diagram of a method for analyzing a plurality of thread dumps from execution of a set of code according to various embodiments.

At 1110, information associated with a plurality of thread dumps is obtained. In some embodiments, 1110 correspond to, or is similar to, 710 of process 700 of FIG. 7.

At 1120, one or more causal or correlated associations between latency and tasks processed are determined based at least in part one or more dimensions of the information associated with a plurality of thread dumps. In some embodiments, 1120 correspond to, or is similar to, 720 of process 700 of FIG. 7, or 820 of process 800 of FIG. 8.

At 1130, a state trace is determined based at least in part on the one or more causal or correlated associations between latency and tasks processed. In some embodiments, 1130 correspond to, or is similar to, 1030 of process 1000 of FIG. 10.

At 1140, a sequence of calls is determined based at least in part on the state trace. In some embodiments, 1130 correspond to, or is similar to, 1040 of process 1000 of FIG. 10.

At 1150, a constraint associated with at least part of the set of code is determined based at least in part on the sequence of calls. In some embodiments, the system determines a bottleneck in connection with executing a set of code based at least in part on isolating a sequence of calls for which one or more performance characteristics are constraining performance or are anomalous (e.g., are outliers relative to other parts of the code). As an example, the system analyzes a memory usage associated with one or more sequence of calls and compares the memory usage to available memory in the system executing the code. As another example, the system analyzes a processing associated with one or more sequence of calls and compares the processing to available processing resources in the system executing the code. As another example, the system analyzes a relative latency information pertaining to the one or more sequence of calls and determines whether a sequence of calls is anomalous and for which an action, alert, notification, log record, timeout, etc., is to be triggered.

At 1160, information associated with the constraint is provided. In some embodiments, the information associated with the constraint comprises an indication of the constraint. As an example, the system provides the information associated with the constraint to a user such as via a user interface that is to be displayed at a client system. In some embodiments, the system prompts the user with a recommendation of an active measure to relieve the identified constraint (e.g., trigger an action, alert, notification, log record, timeout, etc., allocate additional memory to a process or a machine, allocate additional processing resources, redistributing the new tasks to other machines, etc.).

At 1170, a determination is made as to whether process 1100 is complete. In some embodiments, process 1100 is determined to be complete in response to a determination that the performance profiling is complete, no further thread dumps are to be analyzed, the user has exited the system, an administrator indicates that process 1100 is to be paused or stopped, etc. In response to a determination that process 1100 is complete, process 1100 ends. In response to a determination that process 1100 is not complete, process 1100 returns to 1110.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
one or more processors configured to:
obtain a plurality of thread dumps that are dumped during execution of a set of code across different contexts;
determine a relational model based at least in part on the plurality of thread dumps, wherein the relational model is a cuboid lattice model incorporating a plurality of dimensions and associated latency measures;
receive a user input comprising a selection of at least one dimension of the plurality of dimensions over which to analyze the cuboid lattice model;
filter the cuboid lattice model along a dimension of the at least one dimension to obtain a pair of feature vectors; and
determine, based at least in part on a comparison of the pair of feature vectors, latency information pertaining to execution of at least part of the set of code; and
a memory coupled to the one or more processors and configured to provide the one or more processors with instructions.

2. The system of claim 1, wherein the one or more processors are further configured to:
configure at least part of the set of code to perform a thread dump of the plurality of thread dumps into a log.

3. The system of claim 1, wherein determining the latency information comprises:
determining one or more operation times for a plurality of operations associated with executing the set of code.

4. The system of claim 1, wherein determining the latency information comprises:
determining a part of the set of code that corresponds to a bottleneck during execution of the set of code.

5. The system of claim 1, wherein determining the latency information comprises:
determining a thread intensity with respect to one or more threads invoked in connection with execution of at least part of the set of code.

6. The system of claim 1, wherein the one or more processors are further configured to:
provide a user interface to a client terminal, wherein the user interface is configured to display the latency information.

7. The system of claim 1, wherein the one or more processors are further configured to:
detect an anomaly based at least in part on the latency information.

8. The system of claim 1, wherein the plurality of thread dumps comprise information indicating a last stack frame that is being processed at a respective time that the plurality of thread dumps are dumped.

9. The system of claim 8, wherein the plurality of thread dumps further comprise information indicating a last state of a thread at the respective time that the plurality of thread dumps are dumped.

10. The system of claim 8, wherein determining the relational model includes determining a relationship among at least two of: (i) a machine from which a corresponding thread dump is captured, (ii) the last stack frame for the corresponding thread dump, and (iii) a last state of a thread for the corresponding thread dump.

11. The system of claim 1, wherein the latency information indicates a process that is deemed a bottleneck in the set of code.

12. The system of claim 11, wherein the one or more processors are further configured to:
determine a part of the set of code to be the bottleneck in the set of code in response to determining that a relative amount of the plurality of thread dumps comprise information indicating that a last state of a thread corresponds to the part of the set of code.

13. The system of claim 12, wherein the relative amount of the plurality of thread dumps corresponds to a number of thread dumps that exceeds a predetermined threshold number of thread dumps.

14. The system of claim 13, wherein the relative amount of the plurality of thread dumps corresponds to a percentage of thread dumps of a subset of the plurality of thread dumps over a predetermined amount of time exceeds a threshold percentage of thread dumps.

15. The system of claim 12, wherein the relative amount of the plurality of thread dumps corresponds to a percentage of thread dumps of the plurality of thread dumps that exceeds a threshold percentage of thread dumps.

16. The system of claim 1, wherein determining the relational model comprises:
   determine a part of the set of code being executed at a time that the plurality of thread dumps is dumped.

17. The system of claim 16, wherein the latency information is determined based at least in part on an intensity of one or more attributes of the plurality of thread dumps.

18. The system of claim 1, wherein the one or more processors are further configured to cause the plurality of thread dumps to be taken during execution of the set of code.

19. The system of claim 1, wherein the pair of feature vectors comprises an estimated historical vector and a measured vector.

20. A method, comprising:
   obtaining a plurality of thread dumps pertaining to execution of a set of code across different contexts;
   determining a relational model based at least in part on the plurality of thread dumps, wherein the relational model is a cuboid lattice model incorporating a plurality of dimensions and associated latency measures;
   receiving a user input comprising a selection of at least one dimension of the plurality of dimensions over which to analyze the cuboid lattice model;
   filtering the cuboid lattice model along a dimension of the at least one dimension to obtain a pair of feature vectors; and
   determining, based at least in part on a comparison of the pair of feature vectors, latency information pertaining to execution of at least part of the set of code.

21. A computer program product embodied in a non-transitory computer readable medium and comprising computer instructions for:
   obtaining a plurality of thread dumps pertaining to execution of a set of code across different contexts;
   determining a relational model based at least in part on the plurality of thread dumps, wherein the relational model is a cuboid lattice model incorporating a plurality of dimensions and associated latency measures;
   receiving a user input comprising a selection of at least one dimension of the plurality of dimensions over which to analyze the cuboid lattice model;
   filtering the cuboid lattice model along a dimension of the at least one dimension to obtain a pair of feature vectors; and
   determining, based at least in part on a comparison of the pair of feature vectors, latency information pertaining to execution of at least part of the set of code.

* * * * *